United States Patent
Sato

(10) Patent No.: US 11,057,951 B2
(45) Date of Patent: Jul. 6, 2021

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Ryosuke Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/295,340

(22) Filed: Mar. 7, 2019

(65) Prior Publication Data

US 2019/0281643 A1 Sep. 12, 2019

(30) Foreign Application Priority Data

Mar. 12, 2018 (JP) .............................. JP2018-044663
Nov. 27, 2018 (JP) .............................. JP2018-221678

(51) Int. Cl.
 H04W 76/14 (2018.01)
 H04W 4/80 (2018.01)
 H04N 5/232 (2006.01)

(52) U.S. Cl.
 CPC ............ *H04W 76/14* (2018.02); *H04W 4/80* (2018.02); *H04N 5/23206* (2013.01)

(58) Field of Classification Search
 CPC .................................................... H04W 4/80
 See application file for complete search history.

(56) References Cited

U.S. PATENT DOCUMENTS

| 8,953,487 | B2 | 2/2015 | Moritomo | |
| 9,137,849 | B1* | 9/2015 | Wright | H04W 88/026 |
| 2014/0134949 | A1* | 5/2014 | Sakata | H04W 4/80 |
| | | | | 455/41.2 |
| 2014/0342670 | A1* | 11/2014 | Kang | H04M 1/7253 |
| | | | | 455/41.2 |
| 2015/0312703 | A1* | 10/2015 | Maldari | H04W 8/005 |
| | | | | 455/41.2 |
| 2016/0278006 | A1* | 9/2016 | Lee | H04W 76/10 |
| 2017/0201859 | A1* | 7/2017 | Banerjea | G01S 3/48 |
| 2017/0312530 | A1* | 11/2017 | Schilling | A61N 1/362 |

FOREIGN PATENT DOCUMENTS

| JP | 2009188680 A | 8/2009 |
| JP | 2013156858 A | 8/2013 |

* cited by examiner

*Primary Examiner* — Wen W Huang
(74) *Attorney, Agent, or Firm* — Rossi, Kimms & McDowell LLP

(57) ABSTRACT

A communication apparatus operable to perform communication with another communication apparatus that supports a first version of a predetermined communication method or a second version of the predetermined communication method different to the first version, registers a version of the communication method that the other communication apparatus supports, transmits, in a case where the version of the communication method that the other communication apparatus supports is registered, a signal according to the first version or the second version that is registered, and transmits, in a case where the version of the communication method that the other communication apparatus supports is not registered, both a signal according to the first version and a signal according to the second version.

11 Claims, 20 Drawing Sheets

| ITEM | VALUE |
|---|---|
| IDENTIFICATION INFORMATION | UUID(16Byte) |
| SUPPORTED BLE VERSION | BT4 OR BT5 |

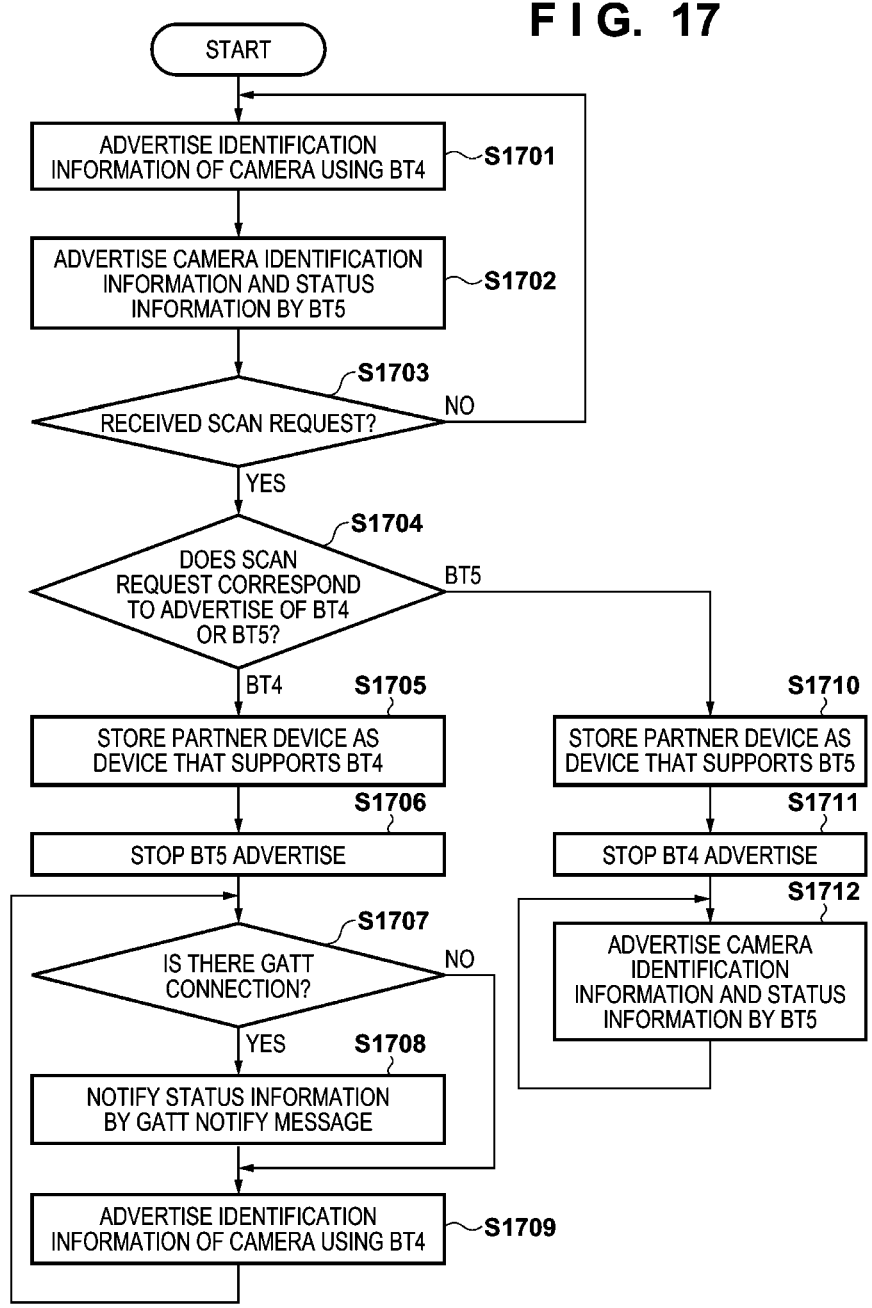
F I G. 17

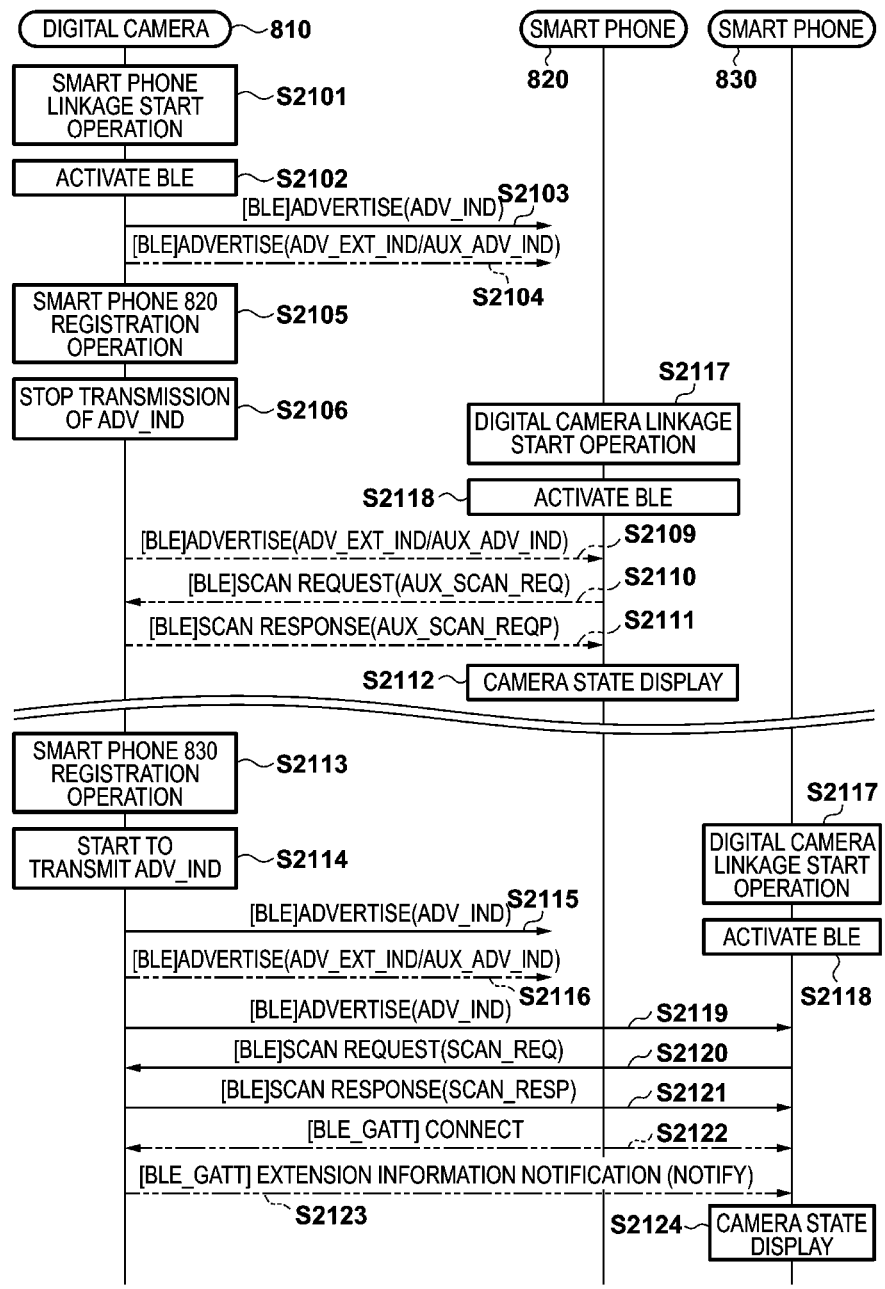

COMMUNICATION APPARATUS, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention is related to a technique of a communication apparatus that operates in accordance with a predetermined communication method.

Description of the Related Art

In a specification of Bluetooth (registered trademark), which is a short-range radio communication standard, performing advertising processing (transmitting an advertising packet) in order to indicate self-presence to multiple apparatuses in the vicinity is defined. In this standard, an apparatus on the side that transmits an advertising packet is referred to as a peripheral device and an apparatus on the side that receives an advertising packet is referred to as a central device.

Recently, a Bluetooth version 5 (hereinafter, referred to as BT5) specification was defined as the latest version of Bluetooth. For example, the size of data that can be notified in an advertising packet differs between BT5 and Bluetooth version 4 (hereinafter referred to as BT4) which is a specification that was defined previously. For example, in BT4, the data that can be notified in an advertising packet is a maximum of 31 bytes. Meanwhile, in BT5, a new advertising packet is defined, and it is possible to notify data of a maximum of 251 bytes. In addition, in the BT5 specification, it is recognized that advertising processing according to BT4 and advertising processing as newly defined in BT5 will be executed in parallel.

Incidentally, since advertising processing according to BT5 is not backward compatible, a central device that supports BT4 but does not support BT5 cannot receive an advertising packet defined in BT5. Meanwhile, a central device that supports BT5 can receive and analyze an advertising packet defined in BT4. Also, a peripheral device that supports BT5 can concurrently transmit advertising packets defined in BT4 and advertising packets defined in BT5.

There are cases where it is possible to unify the Bluetooth version that the central device supports to either BT4 or BT5. In such a case, it is not preferable from the point of view of power consumption in peripheral devices or effective usage or network resources for the peripheral device to continue to perform advertising processing according to both BT4 and BT5. On the other hand, there are cases in which it is not possible to unify the Bluetooth version that the central device supports. In such cases, by a peripheral device performing advertising processing according to BT4 and BT5, device interoperability improves since it is possible to perform communication with central devices that support either of the versions. From these perspectives, it is advantageous for the peripheral device to switch advertising processing to be executed in accordance with what a partner central device supports.

In Japanese Patent Laid-Open No. 2013-156858 and Japanese Patent Laid-Open No. 2009-188680, techniques in which a communication protocol that a partner device supports is determined, and then the type of packets that self transmits is switched are disclosed. In Japanese Patent Laid-Open No. 2013-156858, a technique in which, for the communication protocols UPnP (Universal Plug and Play) and mDNS (Multicast Domain Name System), processing for a communication protocol that a partner device does not support is stopped is disclosed. In Japanese Patent Laid-Open No. 2009-188680, a technique in which, for the 802.11b standard and the 802.11n standard for wireless LAN, a network is generated with the standard that the partner device supports is disclosed. However, neither of these documents discloses that, in a case where a plurality of versions are present for a predetermined communication method for Bluetooth communication or the like, a version that a partner device supports is determined and communication is performed in accordance with the result of the determination.

SUMMARY OF THE INVENTION

According to one aspect of the present invention, there is provided a communication apparatus operable to perform communication with another communication apparatus that supports a first version of a predetermined communication method or a second version of the predetermined communication method different to the first version, which comprises: a registration unit configured to register a version of the communication method that the other communication apparatus supports; and a transmission unit configured to, in a case where the version of the communication method that the other communication apparatus supports is registered by the registration unit, transmit a signal according to the first version or the second version that is registered, and in a case where the version of the communication method that the other communication apparatus supports is not registered by the registration unit, transmit both a signal according to the first version and a signal according to the second version.

Further features of the present invention will become apparent from the following description of exemplary embodiments (with reference to the attached drawings).

BRIEF DESCRIPTION OF THE DRAWINGS

FIG. 17 is a flowchart for representing processing by the digital camera 810 in a second embodiment.

FIG. 21 is an example of a communication sequence between the digital camera 810 and the smart phones 820 and 830 in the third embodiment.

DESCRIPTION OF THE EMBODIMENTS

Below, description is given in detail based on exemplary embodiments of the present invention with reference to the attached drawings. Note that configurations illustrated in the following embodiments are merely examples, and the present invention is not limited to the illustrated configurations.

First Embodiment (BT4 and BT5 Advertising Processing)

Figure 3:
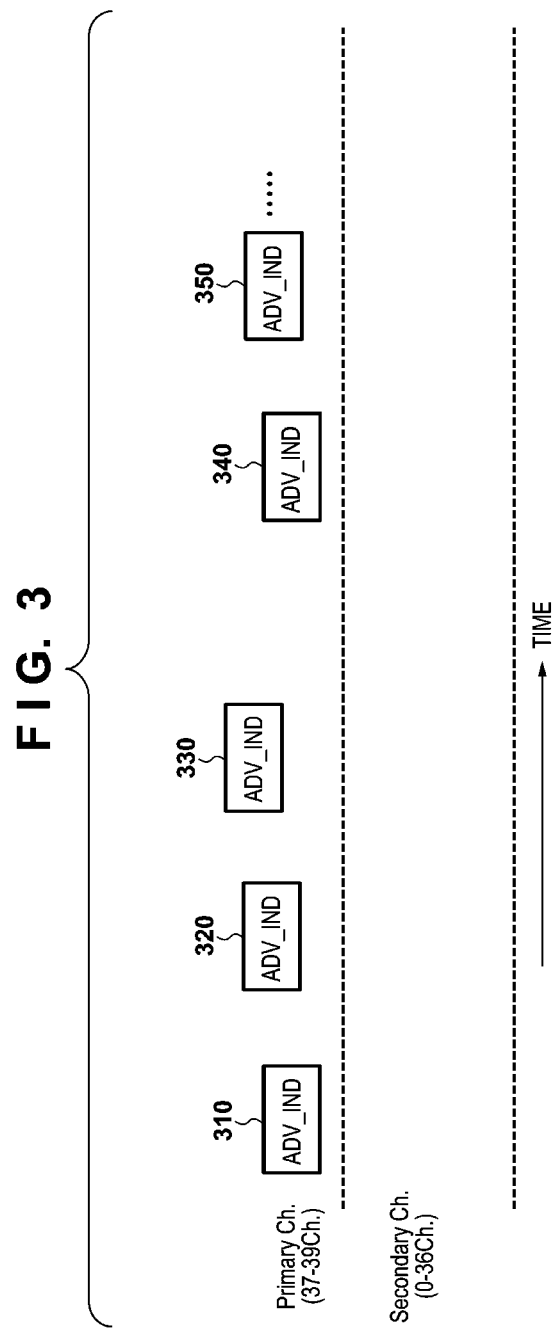
FIG. 3 is a schematic drawing of advertising processing which is defined in BT4.

First, advertising processing defined in BT4 will be described with reference to FIG. 3 and FIG. 4. FIG. 3 illustrates a schematic drawing of advertising processing which is defined in BT4. In FIG. 3, the ordinate represents the communication channel and the abscissa represents the passage of time. ADV_IND packets 310 to 350 are advertising packets. A peripheral device that performs advertising processing transmits the ADV_IND packets 310 to 350 on channels 37Ch to 39Ch (frequency channels) respectively. In the ADV_IND packets 310 to 330, an identifier of the peripheral device (advertising packet transmission source) and advertising data of a maximum of 31 octets are included. The peripheral device periodically performs transmission of one set where the set is the ADV_IND packets 310 to 350.

Figure 4:
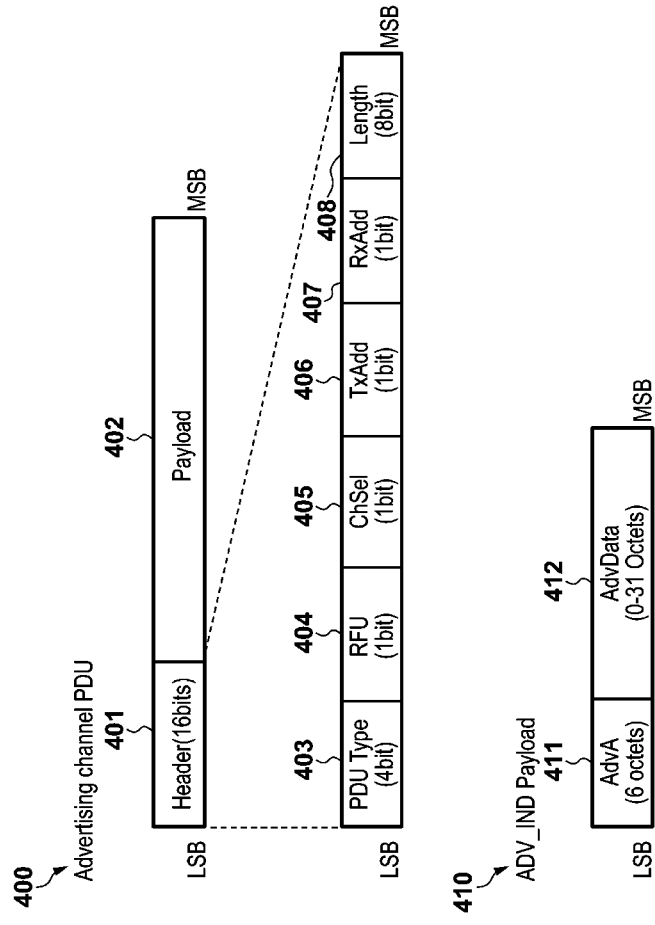
FIG. 4 illustrates an example of a configuration of an advertising packet for the advertising processing which is defined in BT4.

FIG. 4 illustrates an example of a configuration of the ADV_IND packets illustrated in FIG. 3. The ADV_IND packet is generated in accordance with a format indicated by an Advertising Channel PDU 400, and is configured by a Header unit 401 and a Payload unit 402.

The Header unit 401 is configured by a PDU type 403, an RFU 404, a ChSel 405, a TxAdd 406, a RxAdd 407, and a Length 408 data field. The PDU type 403 is a field that represents the type of the Bluetooth packet, and 0000b is designated in the case of ADV_IND. The RFU 404 is a reserved area and is not used. The ChSel 405 is a bit flag that represents whether or not an algorithm (Channel Selection Algorithm #2) for selecting a communication channel to use for a connection and advertising is supported. The TxAdd 406 is a bit flag that represents whether an address designated in an AdvA 411 indicated later represents a public value or a random value. The RxAdd 407 field is not used in an ADV_IND packet. In the Length 408, the length (in octets) of the Payload unit 402 is designated.

The Payload unit 402 (an ADV_IND Payload 410) is configured by the AdvA 411 and an AdvData 412 data field. In the AdvA 411, an address of a peripheral device is designated. In the AdvData 412, advertising data of a maximum of 31 octets that the peripheral device designates is designated.

Figure 5:
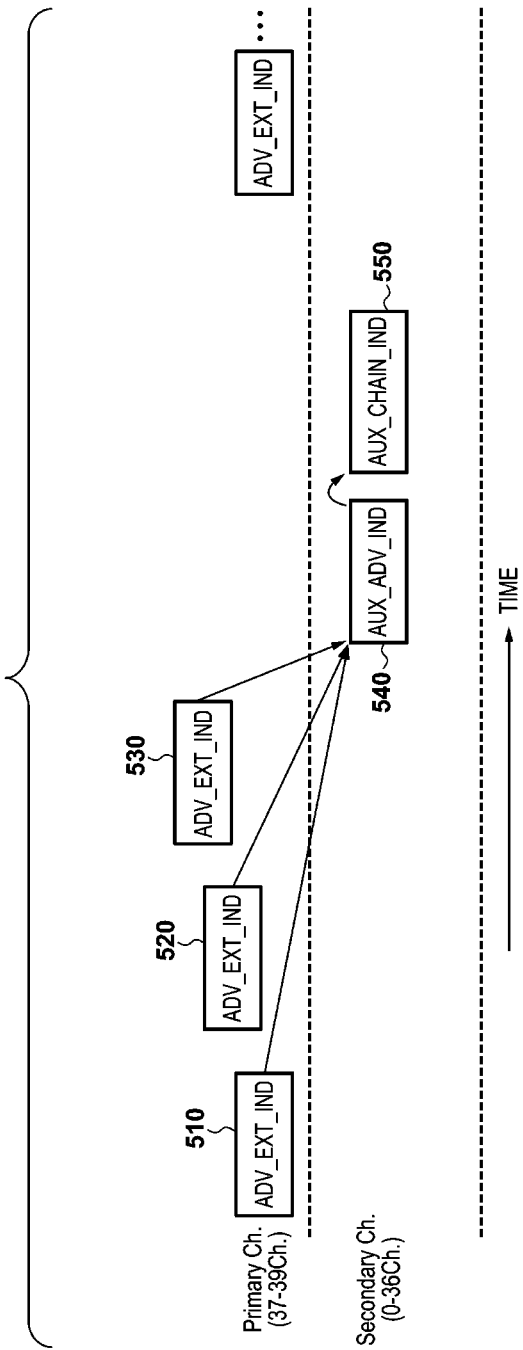
FIG. 5 is a schematic drawing of advertising processing which is defined in BT5.

Next, advertising processing defined in BT5 will be described with reference to FIG. 5 and FIG. 6. FIG. 5 illustrates a schematic drawing of advertising processing which is defined in BT5. In FIG. 5, similarly to in FIG. 3, the ordinate represents the communication channel and the abscissa represents the passage of time. The ADV_EXT_IND packets 510-530, the AUX_AND_IND packet 504, and the AUX_CHAIN_IND packet 550 are advertising packets. A peripheral device that performs advertising processing transmits the ADV_EXT_IND packets 510-530 on channels 37Ch to 39Ch. In the ADV_EXT_IND packets 510-530, information such as an advertising set identifier, and the transmission channel, transmission timing, and the like of the AUX_ADV_IND packet 540 to be transmitted next is designated. The peripheral device, after transmitting the ADV_EXT_IND packets 510-530, transmits the AUX_ADV_IND packet 540 in a channel (0Ch to 36Ch) designated by the ADV_EXT_IND packets 510-530. In the AUX_ADV_IND packet 540, advertising data that software operating on the peripheral device designates is designated. In the case where the advertising data does not all fit into the AUX_ADV_IND packet 540, the peripheral device transmits the remaining data in a subsequent AUX_CHAIN_IND packet 550. Thereafter, the peripheral device periodically performs transmission of one set where the set is made to be the ADV_EXT_IND packets and the AUX_ADV_IND packet 540 (and the AUX_CHAIN_IND packet 550).

Figure 6:
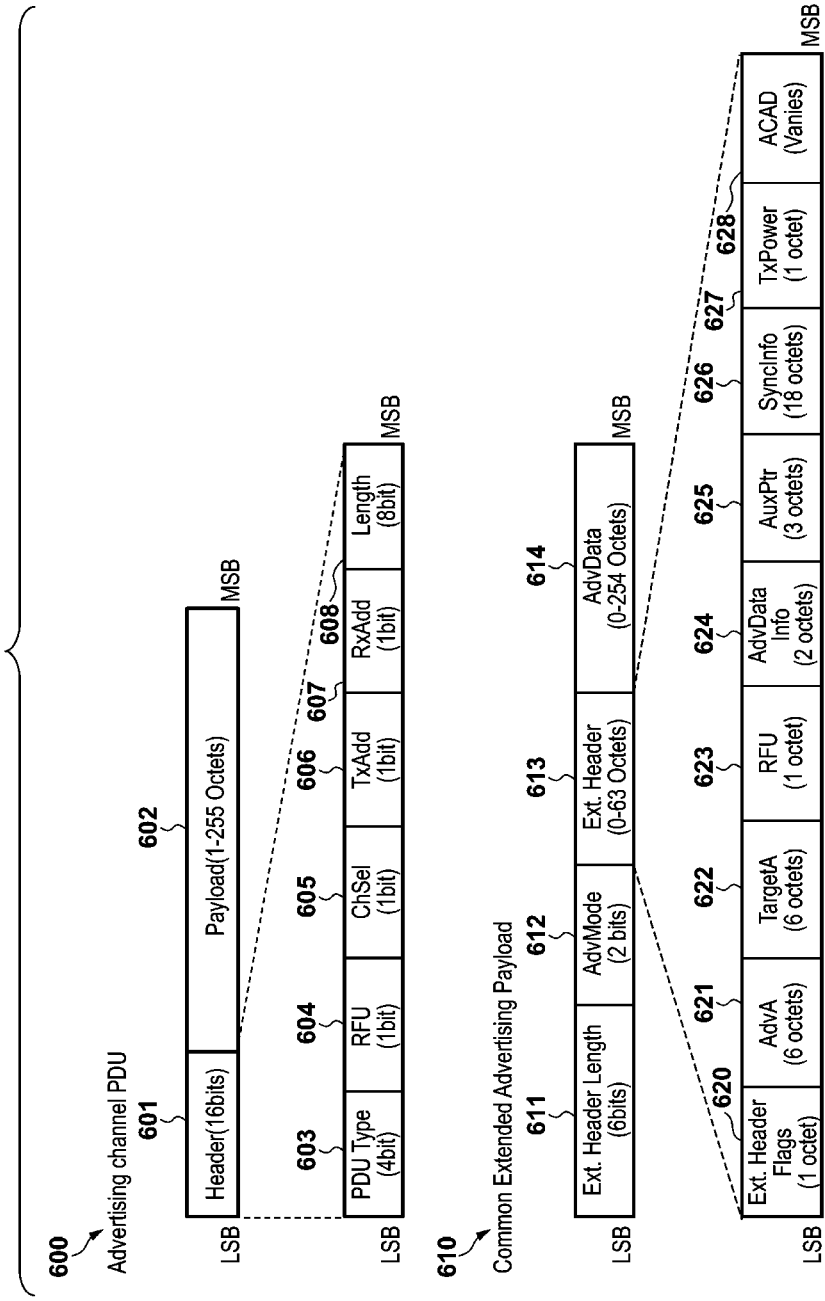
FIG. 6 illustrates an example of a configuration of an advertising packet for the advertising processing which is defined in BT5.

FIG. 6 illustrates an example of a configuration of the ADV_EXT_IND packet, the AUX_ADV_IND packet, and the AUX_CHAIN_IND packet illustrated in FIG. 3. These packets are each generated in accordance with a format indicated by an Advertising Channel PDU 600, and are configured by a Header unit 601 and a Payload unit 602.

The Header unit 601 is configured by a PDU type 603, an RFU 604, a ChSel 605, a TxAdd 606, a RxAdd 607, and a Length 608 data field. The PDU type 603 is a field that represents the type of the Bluetooth packet, and 0111b is designated for all of ADV_EXT_IND, AUX_ADV_IND, and AUX-CHAIN-IND. The RFU 604, the ChSel 605, the TxAdd 606, and the RxAdd 607 are not used in these packets. In the Length 608, the length (in octets) of the Payload unit 602 is designated.

The Payload unit 602 (Common Extended Advertising Payload 610) is configured by an Ext. Header Length 611, an AdvMode 612, an Ext. Header 613, and an AdvData 614 data field. In the Ext. Header Length 611, the length (in octets) of the Ext. Header 613 is designated. The AdvMode 612 is an area that indicates the advertising mode and has a bit flag that indicates whether advertisement connection is possible and whether search is possible. In the AdvData 614, advertising data of a maximum of 251 octets that the peripheral device designates is designated. The Ext. Header 613 includes Ext. Header Flags 620, an AdvA 621, a TargetA 622, an RFU 623, and an AdvData Info 624 data field. The Ext. Header 613 further comprises an AuxPtr 625, a SyncInfo 626, a TxPower 627, and an ACAD 628 data field. The Ext. Header Flags 620 are bit flags representing which data fields among the data fields from the AdvA 621 to the TxPower 627 are included. In the AdvA 621 of the ADV_EXT_IND packet and the AUX_ADV_IND packet, an address of a peripheral device is designated. In the case where advertising processing is performed relative to a specific central device, an address of that central device is designated in the TargetA 622 of the ADV_EXT_IND packet and the AUX_ADV_IND packet. The RFU 623 is a reserved area and is not used. In the AdvData Info 624 field, a 12-bit value for identifying AdvData of the packet and a 4-bit value for identifying an advertising data set of a sequence are designated. In the AuxPtr 625, information of a transmission channel for an advertising packet to follow thereafter, a transmission timing, a type of a transmission PHY, and a precision of an operation clock of the peripheral device are designated. The SyncInfo 626 is not used in the advertising processing illustrated in FIG. 5. In the TxPower 627, data for representing packet transmission output is designated. Extension data is designated in the ACAD 628.

(Peripheral Device Configuration)

Figure 1:
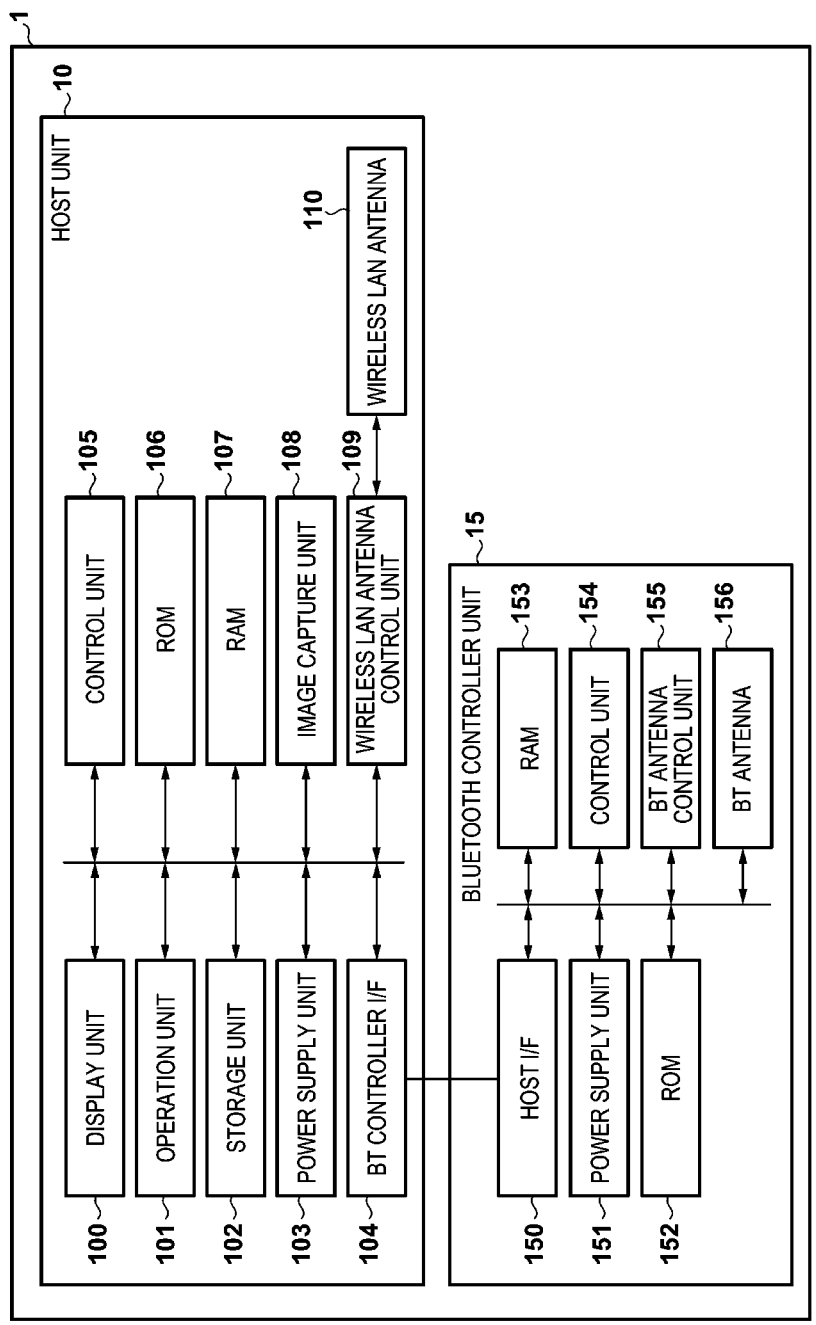
FIG. 1 illustrates an example of a hardware configuration of a communication apparatus 1 which operates as a peripheral device.

Next, description of a configuration of the communication apparatus 1 that operates as a peripheral device in the present embodiment is given. Firstly, the hardware configuration will be described. FIG. 1 illustrates an example of a hardware configuration of the communication apparatus 1. In the present embodiment, a digital camera having a communication function is envisioned for the communication apparatus 1. The communication apparatus 1 is configured by a Host unit 10 and a Bluetooth Controller unit 15.

The Host unit 10 is configured to include a display unit 100, an operation unit 101, a storage unit 102, a power supply unit 103, a BT Controller I/F 104, a control unit 105, a ROM 106, a RAM 107, an image capture unit 108, a wireless LAN antenna control unit 109, and a wireless LAN antenna 110.

The display unit 100 and the operation unit 101 perform display, execution, and the like of an application. The storage unit 102 stores and manages various data such as wireless communication network information, data transmission/reception information, image data, and the like. The power supply unit 103 is a battery, for example, and supplies power for the Host unit 10. The BT Controller I/F 104 is an interface for connecting with the Bluetooth Controller unit 15. The control unit 105 is a CPU, for example, and controls operation of each constituent element of the communication apparatus 1. The ROM 106 stores control commands, in other words a control program. The RAM 107 is used as a work memory when executing a program and for temporary saving of data and the like. The image capture unit 108 performs photograph and moving image capturing. The wireless LAN antenna control unit 109 controls the wireless LAN antenna 110, and performs wireless LAN communication.

The Bluetooth Controller unit 15 is configured to include a Host I/F 150, a power supply unit 151, a ROM 152, a RAM 153, a control unit 154, a BT antenna control unit 155, and a BT antenna 156.

The Host I/F 150 is an interface for connecting with the Host unit 10. The power supply unit 151 is a battery, for example, and supplies power for a BLE Controller unit 15. The ROM 152 is for storing control commands, in other words a control program, and stores a program according to BLE communication in particular here. The RAM 153 is used as a work memory when executing a program and for temporary saving of data and the like. The control unit 154 is a CPU, for example, and controls operation of each constituent element of the BLE Controller unit 15. The BT antenna control unit 155 controls the BT antenna 156 to perform Bluetooth communication.

Figure 2:
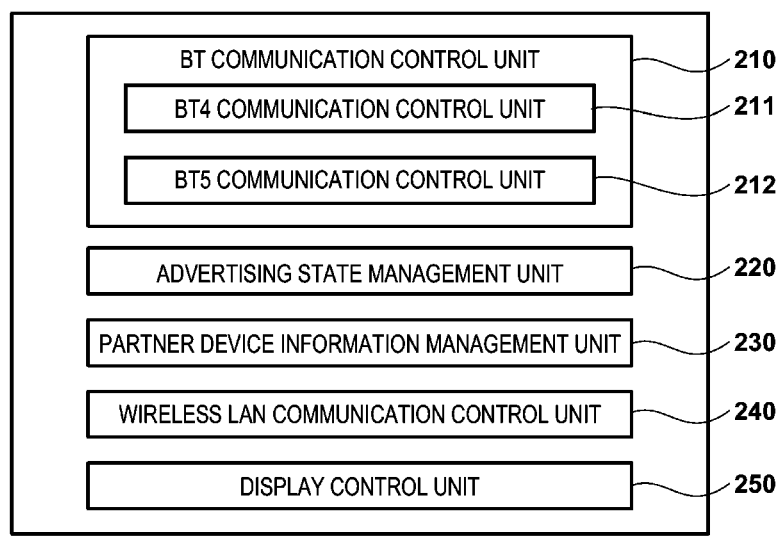
FIG. 2 illustrates an example of a functional configuration of the communication apparatus 1 which operates as a peripheral device.

Next, a functional configuration of the communication apparatus 1 which operates as a peripheral device will be described. FIG. 2 illustrates an example of a functional configuration of the communication apparatus 1. Note that in the present embodiment, it is assumed that a function of each constituent element of the functional configuration illustrated below is implemented as a software program, but some or all of the functional configuration may be implemented as hardware.

A BT communication control unit 210 controls Bluetooth communication via the BT antenna control unit 155. The BT communication control unit 210 is configured by a BT4 communication control unit 211 and a BT5 communication control unit 212. The BT4 communication control unit 211 controls Bluetooth communication according to BT4, and executes advertising processing explained in detail by using FIG. 3 and FIG. 4. The BT5 communication control unit 212 controls Bluetooth communication according to BT5, and executes advertising processing explained in detail by using FIG. 5 and FIG. 6.

An advertising state management unit 220 instructs the BT communication control unit 210 as to which of BT4 and BT5 to execute advertising processing in accordance with. Also, the advertising state management unit 220 manages an execution state of advertising processing in the BT communication control unit 210.

Figures 8, 9:
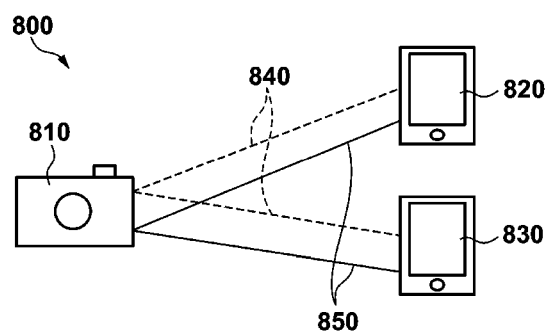
FIG. 8 is a schematic drawing of a communication system 800 in the first embodiment.
FIG. 9 is a view which illustrates a configuration of partner device information which the communication apparatus stores in the first embodiment.

A partner device information management unit 230, by using a table, for example, manages device information of a partner device with which the communication apparatus 1 communicates by Bluetooth and wireless LAN. In FIG. 9, an example of a partner device management table 900 that the partner device information management unit 230 uses to manage device information of the partner device is illustrated. Note that in the present embodiment, it is assumed that the communication apparatus 1 can manage device information for one partner device. The partner device management table 900 is configured to include identification information 920 for uniquely identifying a partner device and supported BLE version information 930 for representing a version of Bluetooth that the partner device supports. In the present embodiment, the identification information 920 is a UUID (Universally Unique Identifier) of a partner device, for example. In addition, the supported BLE version information 930 corresponds to a value that represents BT4 or BT5.

Returning to FIG. 2, a wireless LAN communication control unit 240 controls the wireless LAN communication via the wireless LAN antenna control unit 109. A display control unit 250 performs various display control in relation to the display unit 100.

(System Configuration)

Next, a configuration of a communication system envisioned for the present embodiment will be described. FIG. 8 is a schematic drawing of a communication system 800 in the first embodiment. The communication system 800 is configured by a digital camera 810 and smart phones 820 and 830 that partner with the digital camera 810. The digital camera 810 is assumed to be the communication apparatus 1 configured as described above and operating as a peripheral device. In addition, the smart phones 820 and 830 operate as central devices; it is assumed that the smart phone 820 supports BT5 and that the smart phone 830 supports BT4 but does not support BT5. In other words, the smart phone 820 supports BT5, and the smart phone 830 supports BT4 but does not support BT5. In addition, it is assumed that the digital camera 810 and the smart phones 820 and 830 can use Bluetooth communication 840 and wireless LAN communication 850 to perform signal communication with each other. Note that in the following description, (at least) one of the smart phones 820 and 830 will be referred to as the partner device generally.

(Processing Flow)

Figure 7:
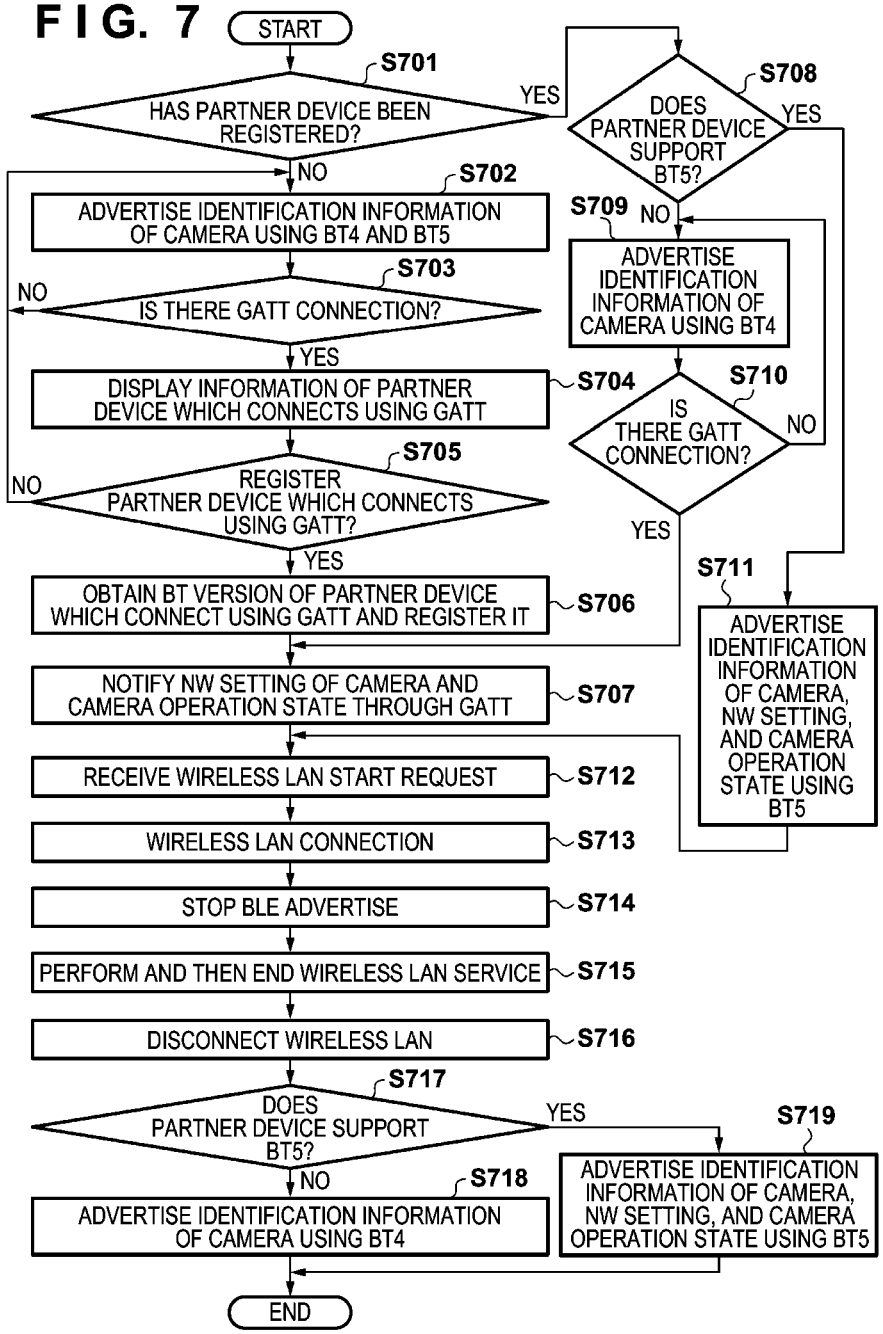
FIG. 7 is a flowchart for representing processing by a digital camera 810 in a first embodiment.

Next, with reference to FIG. 7, a flow of processing of the digital camera 810 will be described. FIG. 7 is a flowchart representing processing by the digital camera 810. The flowchart illustrated in FIG. 7 can be realized by the control unit 105 and the control unit 154 of the digital camera 810 executing control programs that are stored in the ROM 106 and the ROM 152, and executing control of respective hardware as well as computation and processing of information. This processing can be started by a user operating the operation unit 101 of the digital camera 810 to instruct the start of linkage processing.

When this processing is started, the partner device information management unit 230 of the digital camera 810 refers to the partner device management table 900 to confirm (step S701) whether device information (refer to FIG. 9) of a partner device is registered. In the case where device information of the partner device has not been registered (NO in step S701), the BT communication control unit 210 starts (step S702) advertising processing (FIG. 3 and FIG. 4) according to BT4 and advertising processing (FIG. 5 and FIG. 6) according to BT5. In other words, the BT communication control unit 210 transmits both advertising packets according to BT4 and advertising packets according to BT5. In this processing, the digital camera 810, as a self-identifier, sets a self UUID in the advertising packets that it then transmits. More specifically, the digital camera 810 sets 16-byte UUID data in the AdvData field 412 of the ADV_IND packet and the AdvData field 614 of the AUX_ADV_IND packet which it then transmits.

Next, the BT communication control unit 210 awaits (step S703) a connection according to communication (hereinafter "a GATT communication") according to a GATT (Generic Attribute) profile from the partner device. When a connection with a partner device in a GATT communication (YES in step S703) is performed, the BT communication control unit 210 of the digital camera 810 obtains identification information of the partner device. Then, the display control unit 250 displays (step S704), on the display unit 100, the obtained identification information and a menu that allows a user to select whether or not to register the partner device with which the connection was made. In a case where the user operates the operation unit 101 to select a menu item for not registering the connected partner device (NO in step S705), the BT communication control unit 210 disconnects the connection of the GATT communication with the connected partner device, and continues the advertising processing of step S702. Meanwhile, in a case where the user selects a menu for registering the connected partner device (YES in step S705), the BT communication control unit 210 uses a GATT communication to obtain (step S706) the Bluetooth version that the connected partner device supports. The obtained identification information and the supported Bluetooth version are respectively registered in the partner device management table 900 by the partner device information management unit 230 as the identification information 920 and the supported BLE version information 930. The BT communication control unit 210, using the GATT communication, notifies (step S707), to the partner device, setting information for the wireless LAN network that the wireless LAN communication control unit 240 generates and the operation state of the digital camera 810.

Next, when the BT communication control unit 210 receives (step S712) a wireless LAN start request message from the partner device by a GATT communication, the wireless LAN communication control unit 240 generates (step S713) a wireless LAN network as an access point. The digital camera 810, in this state, awaits a wireless LAN connection from the partner device. Also, the BT communication control unit 210 stops (step S714) Bluetooth advertising processing. When the linkage processing with the partner device that used the wireless LAN communication ends (step S715), the wireless LAN communication control unit 240 stops (step S716) the access point function, and disconnects the wireless LAN connection with the partner device. Next, the partner device information management unit 230 confirms (step S717) the supported BLE version information 930 of the partner device that is registered in the partner device management table 900. In the case where the partner device supports BT4 (NO in step S717), the BT communication control unit 210 starts (step S718) advertising processing according to BT4. In the advertising processing, a UUID of the digital camera is transmitted. Meanwhile, in the case where the partner device supports BT5 (YES in step S717), the BT communication control unit 210 starts (step S719) advertising processing according to BT5. In this advertising processing, the UUID of the digital camera, setting information for a wireless LAN network that the wireless LAN communication control unit 240 generates, and an operation state of the digital camera 810 are transmitted.

In a case where in the confirmation processing of step S701, device information of the partner device has been registered (YES in step S701), the partner device information management unit 230 confirms (step S708) the supported BLE version information 930 of the partner device registered in the partner device management table 900. In the case where the partner device supports BT4 (NO in step S708), the BT communication control unit 210 starts (step S709) advertising processing according to BT4. In the advertising processing, a UUID of the digital camera 810 is transmitted. Next, the BT communication control unit 210 awaits (step S710) a connection by a GATT communication from a partner, and when a connection with a partner device by a GATT communication is performed (YES in step S710), the digital camera 810 performs the above-described processing from step S707.

Meanwhile, in the case where the partner device supports BT5 (YES in step S708), the BT communication control unit 210 starts (step S711) advertising processing according to BT5. In this advertising processing, the UUID of the digital camera, setting information for a wireless LAN network that the wireless LAN communication control unit 240 generates, and an operation state of the digital camera 810 are transmitted. Note that setting information of the wireless LAN network notified here and data of the operation state of the digital camera 810 may be the same as the transmission data in the GATT communication in step S707. Next, the digital camera 810 performs the processing from step S712 as described above.

Figure 10:
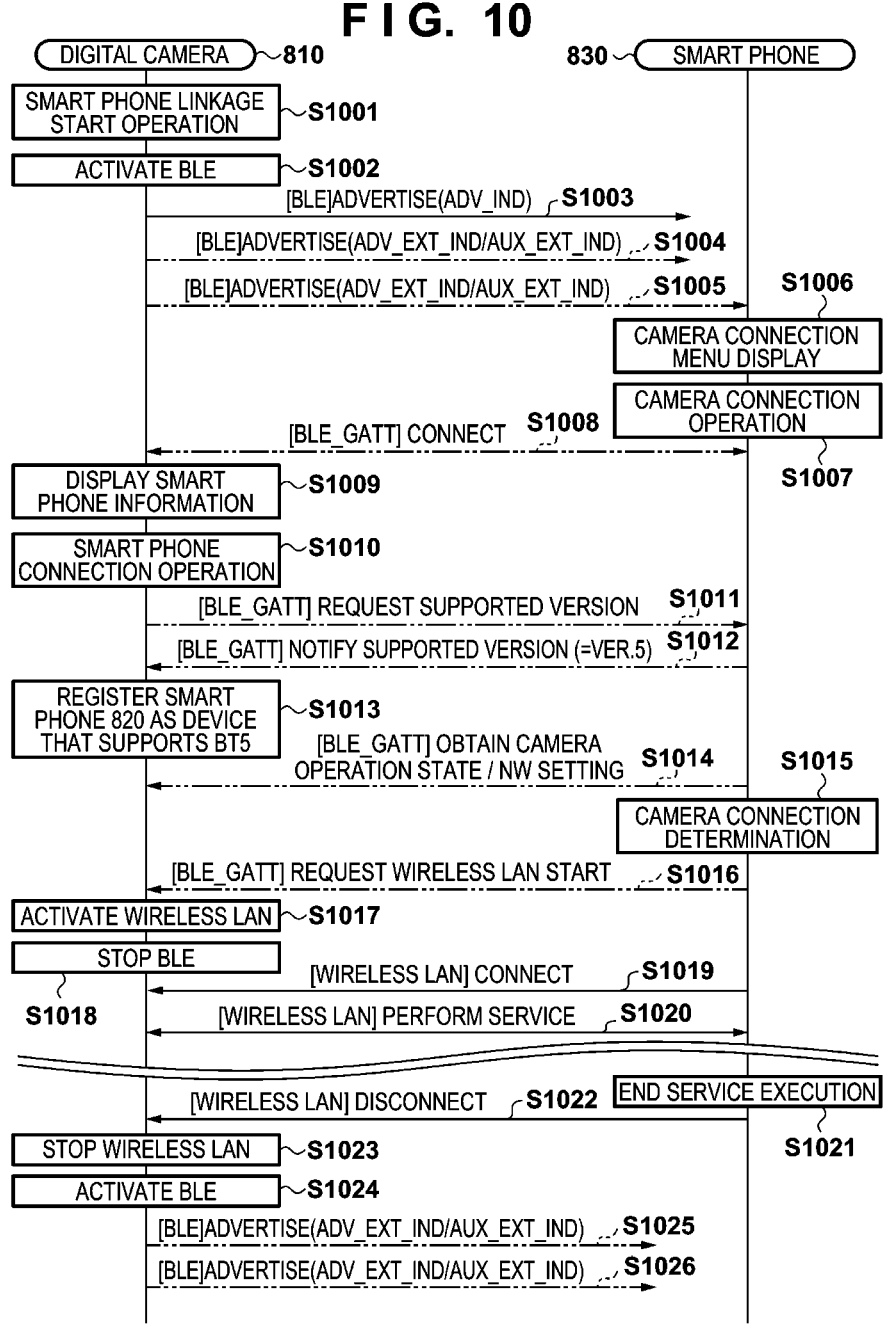
FIG. 10 is an example of a communication sequence between the digital camera 810 and a smart phone 820 in the first embodiment.

Next, using the sequence charts of FIG. 10 to FIG. 13, an example of a communication sequence between the digital camera 810 and the smart phones 820 and 830 in the present embodiment will be described in detail. FIG. 10 is a communication sequence for a case where the digital camera 810 and the smart phone 820 first connect. As previously described, it is assumed that the smart phone 820 supports BT5.

When the user operates the digital camera 810 and instructs (step S1001) the start of linkage processing with the smart phone, the BT communication control unit 210 activates (step S1002) the Bluetooth communication function, and starts advertising processing. The BT communication control unit 210 periodically transmits (refer to FIG. 3 to FIG. 6) advertising packets according to BT4 (step S1003) and advertising packets according to BT5 (step S1004). The smart phone 820, which supports BT5, receives (step S1005) the advertising packets according to BT5, and displays (step S1006) to the user a menu (presence of the digital camera 810) for connecting with the digital camera 810.

When the user performs (step S1007) an operation for connecting with the digital camera 810 in the smart phone 820, the smart phone 820 attempts (step S1008) a GATT communication connection with the digital camera 810. The digital camera 810 displays (step S1009) on the display unit 100 identification information (address information) of the smart phone 820 that was obtained by the GATT communication connection (step S1008) and a menu for allowing a user to select whether or not to register the smart phone 820. When the user, in the digital camera 810, selects (step S1010) a menu for registering the smart phone 820, the digital camera 810 transmits (step S1011) a message for requesting the version of Bluetooth that the smart phone 820 supports by using a GATT communication. The smart phone 820 receives this and transmits (step S1012) to the digital camera 810 a response message indicating that the smart phone 820 supports BT5. The digital camera 810 receives this, and registers (step S1013), in the partner device management table 900, identification information and the supported Bluetooth version of the smart phone 820 as the identification information 920 and the supported BLE version information 930 respectively.

Next, the smart phone 820 obtains (step S1014) the operation state of the digital camera 810 and setting information for the wireless LAN network from the digital camera 810 by the GATT communication, and determines (step S1015) whether or not it is possible to make a wireless LAN connection with the digital camera 810. When the smart phone 820 determines that it is possible to make a wireless LAN connection, the smart phone 820 transmits, by a GATT communication, (step S1016) a message that requests the digital camera 810 to start the wireless LAN function. The digital camera 810 receives this and activates (step S1017) the wireless LAN function, and stops (step S1018) the Bluetooth advertising processing. The smart phone 820 uses the setting information obtained in step S1014 to connect (step S1019) by wireless LAN to the network that the digital camera 810 generated, and start (step S1020) service linkage processing that uses wireless LAN communication.

When, thereafter, the user ends (step S1021) the service linkage processing by operating the smart phone 820, the smart phone 820 disconnects (step S1022) the wireless LAN connection with the digital camera 810. When the digital camera 810 detects the disconnection of the wireless LAN, the digital camera 810 stops (step S1023) the wireless LAN function and activates (step S1024) the Bluetooth communication function. Because it was stored in step S1013 that the smart phone 820 supports BT5, the BT communication control unit 210 periodically transmits (step S1025, step S1026) only advertising packets according to BT5. A UUID of the digital camera 810, an operation state, and setting information for the wireless LAN network that the digital camera 810 generates may be included in these advertising packets.

Figure 11:
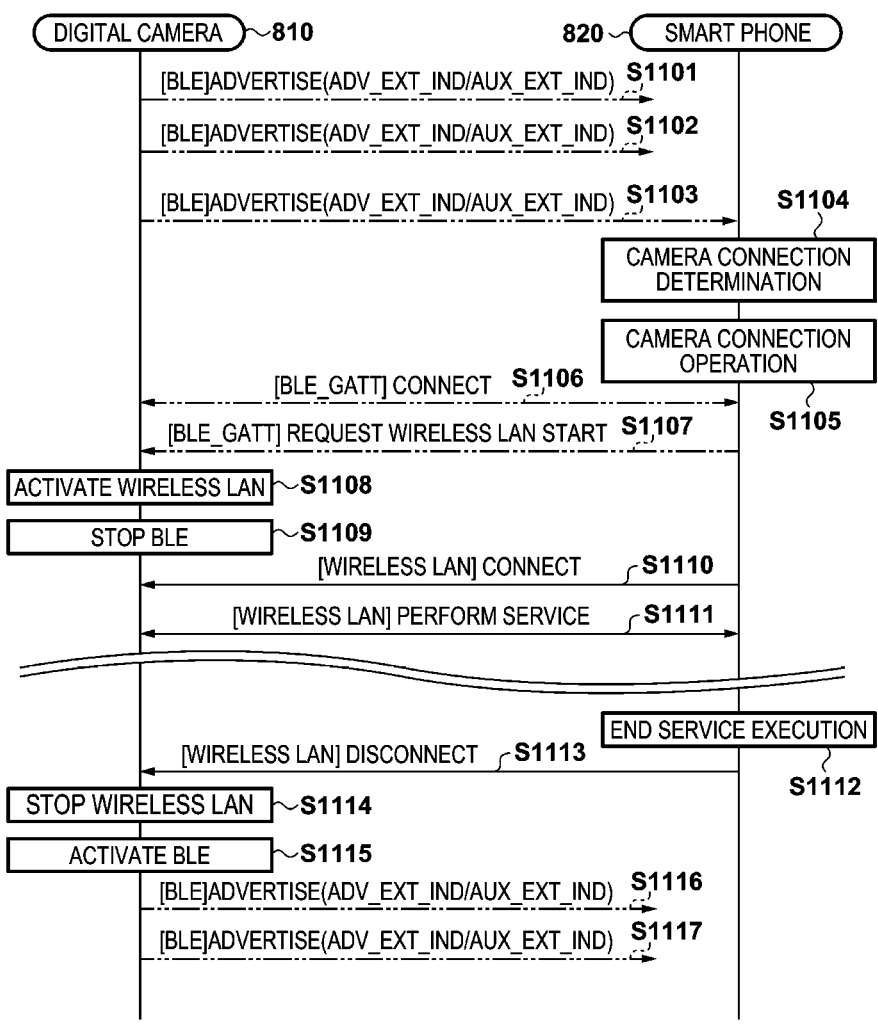
FIG. 11 is another example of a communication sequence between the digital camera 810 and the smart phone 820 in the first embodiment.

FIG. 11 is a communication sequence for a case where the digital camera 810 and the smart phone 820 connect for the second time or more, after the processing of FIG. 10 has completed. Because the digital camera 810 stored that the smart phone 820 supports BT5, the digital camera 810, by the BT communication control unit 210, periodically transmits (step S1101, step S1102) only advertising packets according to BT5. When the smart phone 820 receives (step S1103) an advertising packet, the smart phone 820 obtains from the advertising packet the UUID of the digital camera 810, the operation state, and the setting information for the wireless LAN network that the digital camera 810 generates. The smart phone 820 determines (step S1104) whether or not a wireless LAN connection with the digital camera 810 is possible by using this information. In a case where connection is determined to be possible, the smart phone 820 displays a message that prompts the user to confirm the connection, and then the user confirms (step S1105) by operating the smart phone 820. When a confirmation operation is performed by the user, the smart phone 820 attempts (step S1106) a GATT communication connection with the digital camera 810. The processing of step S1107 to step S1117 thereafter is the same as step S1016 to step S1026 as illustrated in FIG. 10, and description thereof will be omitted.

Figure 12:
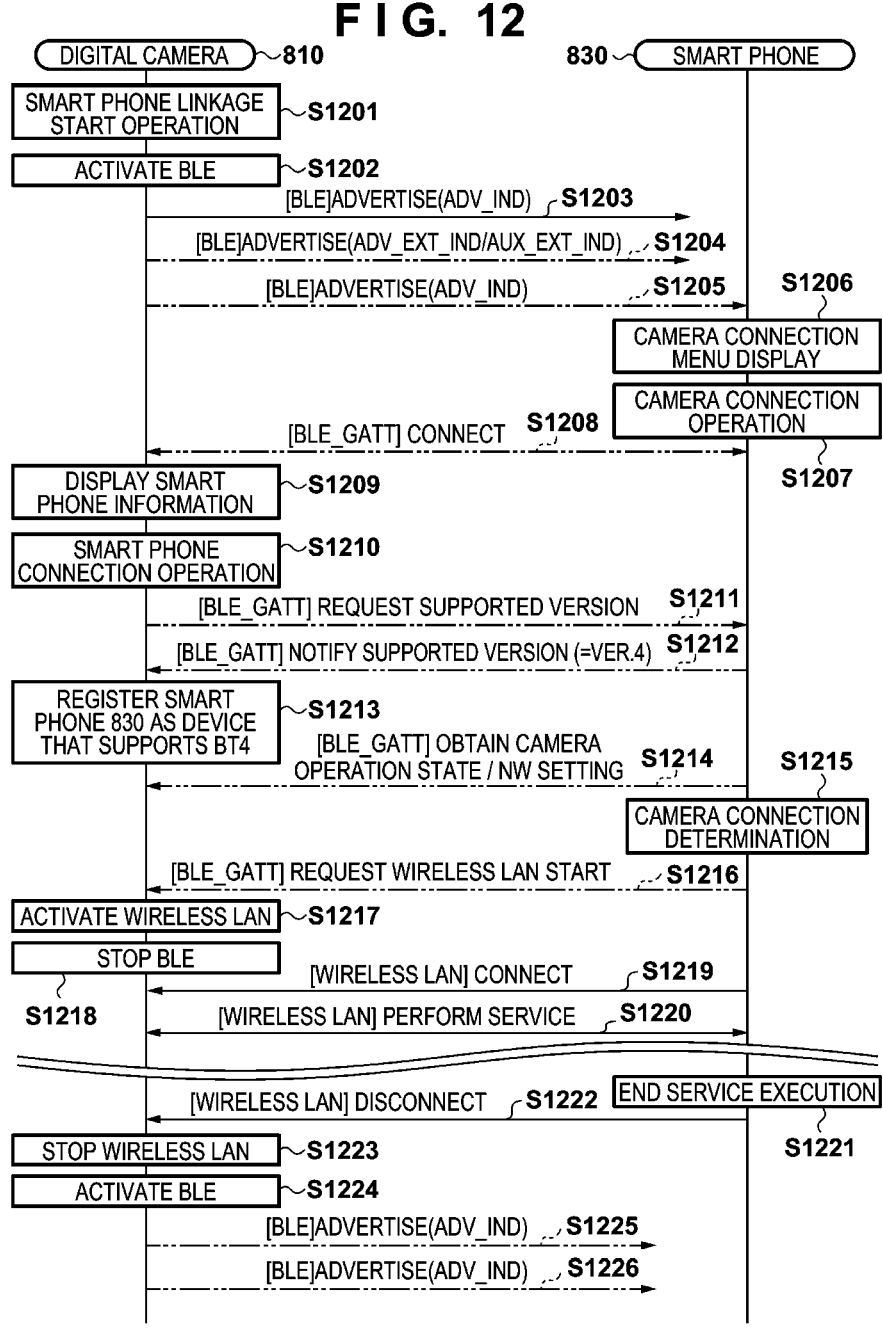
FIG. 12 is an example of a communication sequence between the digital camera 810 and a smart phone 830 in the first embodiment.

FIG. 12 is a communication sequence for a case where the digital camera 810 and the smart phone 830 first connect. As previously described, it is assumed that the smart phone 830 supports BT4 but does not support BT5. Note that only differences from FIG. 10 will be described below. After the start of processing, operation of the digital camera 810 is the same as in FIG. 10, but since the smart phone 830 does not support BT5, the smart phone 830 receives (step S1205) advertising packets according to BT4. Thereafter, the processing of step S1206 to step S1211 is the same as step S1006 to step S1011. The smart phone 830, after receiving the supported the version request message (step S1211), transmits (step S1212) to the digital camera 810 a response message that indicates that the smart phone 830 supports BT4. The digital camera 810 receives this and registers (step S1213) in the partner device management table 900 that the smart phone 830 supports BT4. Thereafter, the processing of step S1214 to step S1224 is the same as step S1014 to step S1024. When the digital camera 810 activates (step S1224) the Bluetooth communication function, the digital camera 810 periodically transmits (step S1225, step S1226) only advertising packets according to BT4. In the advertising packets, a UUID of the digital camera 810 may be included.

Figure 13:
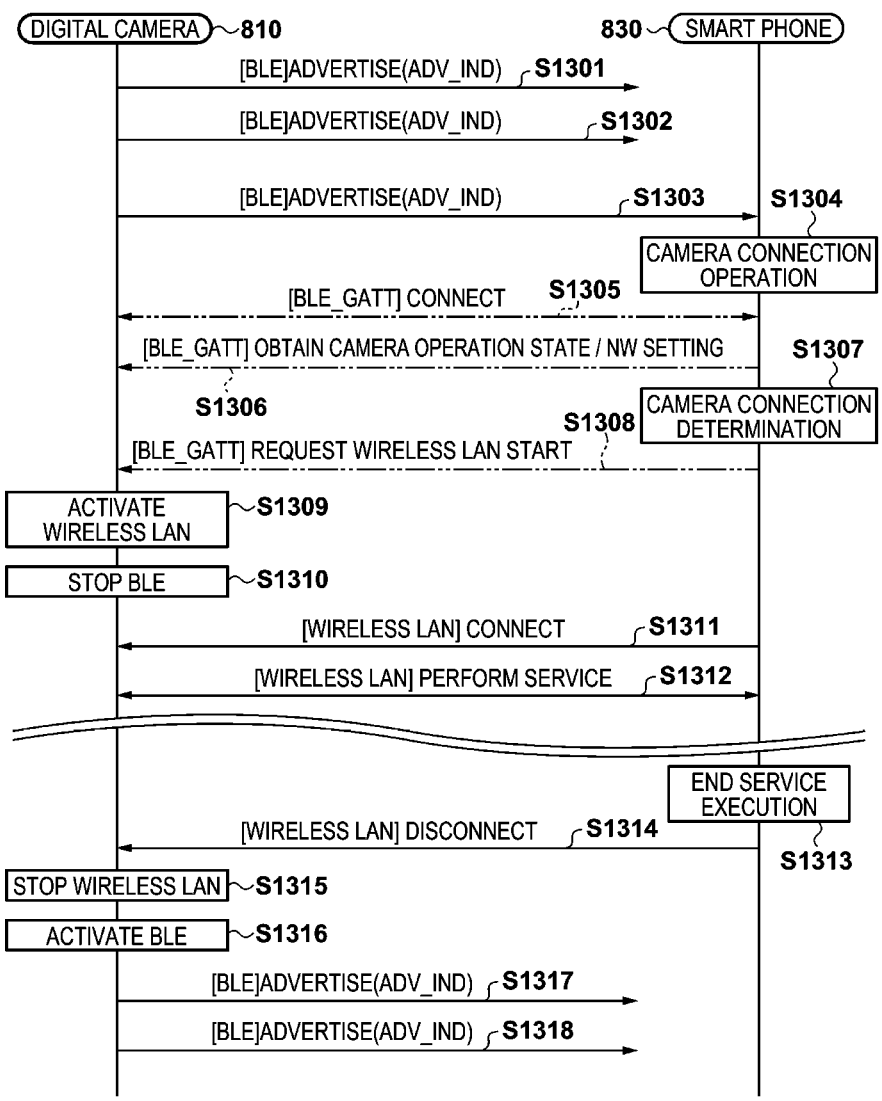
FIG. 13 is another example of a communication sequence between the digital camera 810 and the smart phone 830 in the first embodiment.

FIG. 13 is a communication sequence for a case where the digital camera 810 and the smart phone 830 connect for the second time or more, after the processing of FIG. 12 has completed. Because the digital camera 810 stored that the smart phone 830 supports BT4, the digital camera 810, by the BT communication control unit 210, periodically transmits (step S1301, step S1302) only advertising packets according to BT4. When the smart phone 830 receives (step S1303) the advertising packet, the smart phone 830 obtains the UUID of the digital camera 810 from the advertising packet, and displays to the user the presence of the digital camera 810. When the user performs (step S1304) an operation for connecting with the digital camera 810 in the smart phone 830, the smart phone 830 attempts (step S1305) a GATT communication connection with the digital camera 810. Next, the smart phone 830 obtains (step S1306) the operation state of the digital camera 810 and the network setting from the digital camera 810 by a GATT communication, and determines (step S1307) whether or not it is possible to make a wireless LAN connection with the digital camera 810. The processing of step S1308 to step S1318 thereafter is the same as step S1216 to step S1226 as illustrated in FIG. 12, and description thereof will be omitted.

As described above, by virtue of the present embodiment, the communication apparatus can transmit an appropriate advertisement packet in accordance with the Bluetooth version that the partner device supports. By this, it is possible to reduce power consumption in the communication apparatus.

Second Embodiment

In the first embodiment, a method (step S706) of using a GATT communication was described as the method by which the communication apparatus 1 (the digital camera 810) determines the Bluetooth version that the partner device supports. However, the present invention is not limited to this method, and the determination may be performed using another method. Hereinafter, an example in which the Bluetooth version that the partner device supports is determined by using a scan packet corresponding to an advertising packet will be illustrated.

(BT4 and BT5 Scan Processing)

Figure 14:
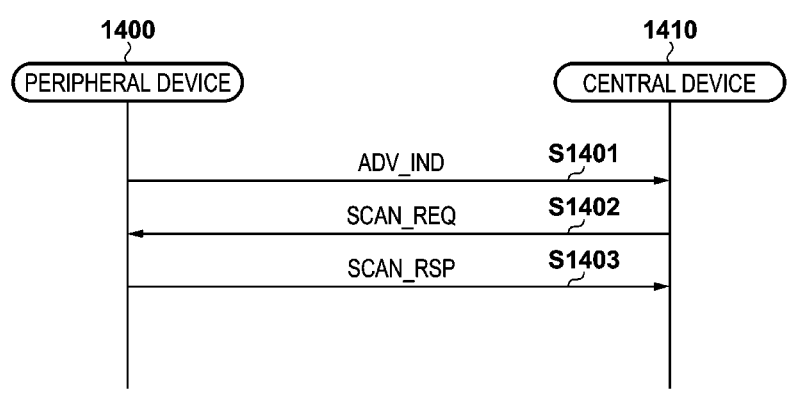
FIG. 14 is a sequence diagram which describes scan processing which is defined in BT4.

First, scan processing defined in BT4 will be described with reference to FIG. 14 and FIG. 15. FIG. 14 is a sequence diagram which describes scan processing which is defined in BT4. When a central device 1410 receives (step S1401) an ADV_IND packet that a peripheral device 1400 which performs advertising processing transmits, the central device 1410 transmits (step S1402) to the peripheral device 1400 a SCAN_REQ packet. At that time, the central device 1410 transmits a SCAN_REQ packet in the same channel as the channel in which the ADV_IND packet is received. The peripheral device 1400, after receiving the SCAN_REQ packet, replies (step S1403) thereto by transmitting to the central device 1410 a SCAN_RSP packet.

Figure 15:
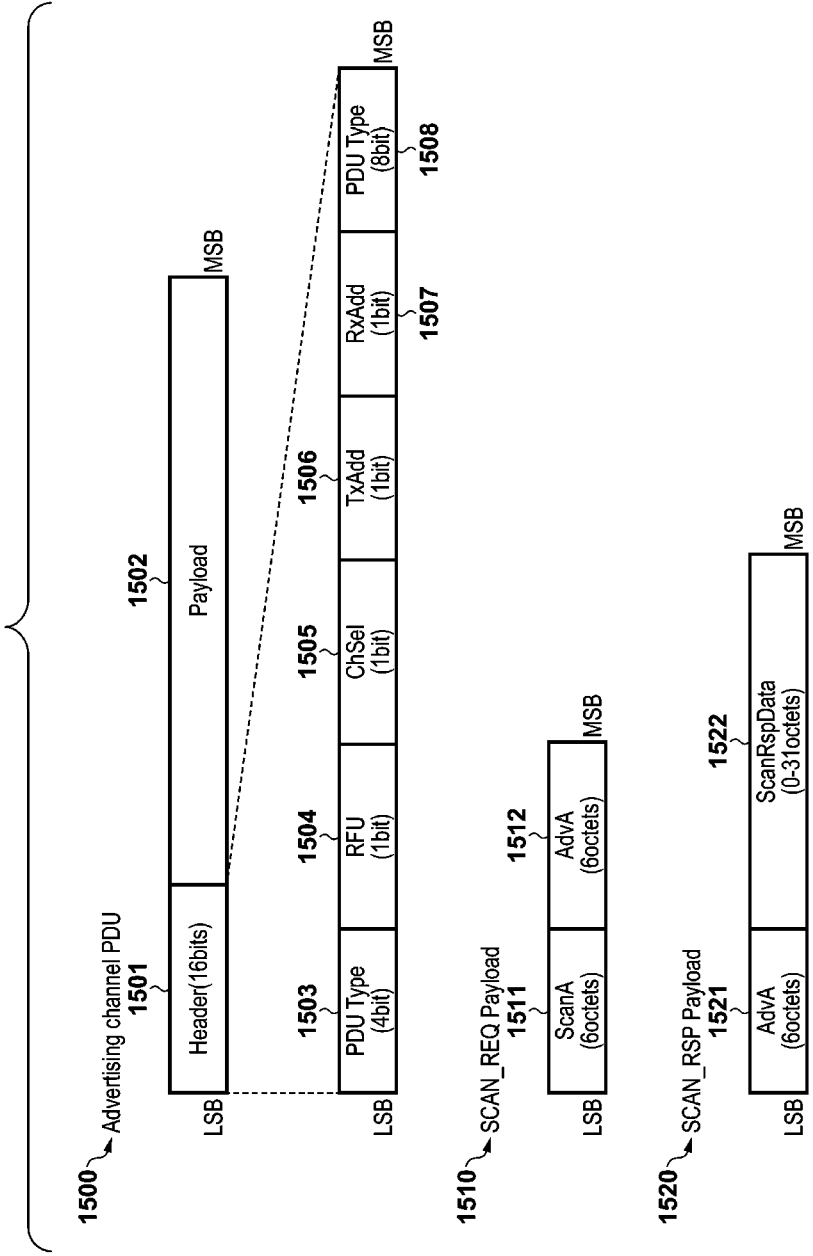
FIG. 15 illustrates an example of a configuration of the SCAN_REQ packet and the SCAN_RSP packet which are illustrated in FIG. 14.

FIG. 15 illustrates an example of a configuration of the SCAN_REQ packet and the SCAN_RSP packet which are illustrated in FIG. 14. The SCAN_REQ packet and the SCAN_RSP packet are generated in accordance with the format illustrated by an Advertising Channel PDU 1500, and are configured by a Header unit 1501 and a Payload unit 1502. Note that the configuration of the Header unit 1501 is the same as is described in previously-described FIG. 4 of the first embodiment, and so description thereof will be omitted. Note that 0011b is designated in a PDU type 1503 in the case of a SCAN_REQ packet and 0100b is designated in the PDU type 1503 in the case of the SCAN_RSP packet.

A SCAN_REQ Payload 1510 indicates a configuration of the Payload unit 1502 of the SCAN_REQ packet. The SCAN_REQ Payload 1510 is configured by a ScanA 1511 and an AdvA 1512 data field. In the ScanA 1511, an address of a central device that transmits a SCAN_REQ is designated. In the AdvA 1512, an address of a peripheral device that transmits an ADV_IND is designated.

A SCAN_RSP Payload 1520 indicates a configuration of the Payload unit 1502 of the SCAN_RSP packet. The SCAN_RSP Payload 1520 is configured by an AdvA 1521 and a ScanRspData 1522 data field. In the AdvA 1521, an address of a peripheral device is designated. In the ScanR-spData 1522, response data of a maximum of 31 octets that the peripheral device designates is designated.

Figure 16:
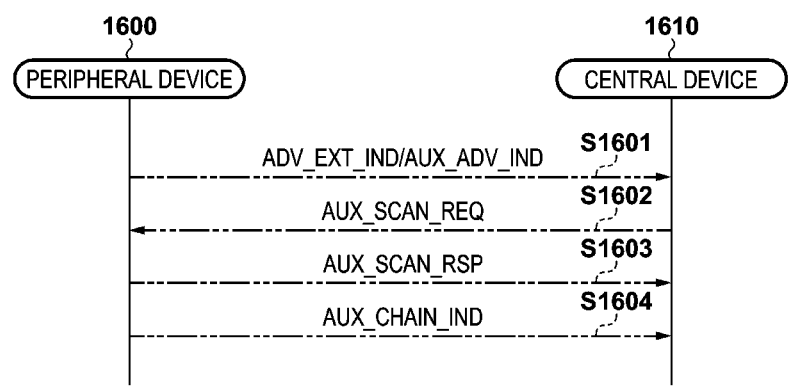
FIG. 16 is a sequence diagram which describes scan processing which is defined in BT5.

Next, scan processing defined in BT5 will be described with reference to FIG. 16. FIG. 16 is a sequence diagram which describes scan processing which is defined in BT5. When a central device 1610 receives (step S1601) an AUX_ADV_IND packet that a peripheral device 1600 transmits, the central device 1610 transmits (step S1602) to the peripheral device 1600 an AUX_SCAN_REQ packet. At that time, the central device 1610 transmits an AUX_SCAN_REQ packet in the same channel as the channel in which the AUX_ADV_IND packet is received. The peripheral device 1600, after receiving the AUX_SCAN_REQ packet, transmits (step S1603) to the central device 1610 an AUX_SCAN_RSP packet having set response message data. In addition, in the case where the response message data does not all fit into the AUX_SCAN_RSP packet, the peripheral device 1600 transmits the remaining data in a subsequent AUX_CHAIN_IND packet (step S1604).

Since the data configuration of the AUX_SCAN_REQ packet is the same as the SCAN_REQ packet previously-described in FIG. 15, description thereof will be omitted.

The AUX_SCAN_RSP packet is generated in accordance with the format of the Advertising Channel PDU 600 described using FIG. 6 in the previously-described first embodiment. Since the value designated in the Header unit 601 is the same as that of the ADV_EXT_IND, AUX_ADV_IND, and AUX_CHAIN_IND packets described in the foregoing first embodiment, description thereof will be omitted. In the Ext. Header Length 611, the length (in octets) of the Ext. Header 613 is designated. 00b is designated in the AdvMode 612. In the AdvData 614, response data of a maximum of 251 octets that the peripheral device designates is designated. In the Ext. Header Flags 620, bit flags representing which data fields among the data fields from the AdvA 621 to the TxPower 627 are included are designated. In the AdvA 621, an address of a peripheral device is designated. In the AUX_SCAN_RSP packet, the TargetA 622, the RFU 623, and the AdvData Info 624 field are not used. In the AuxPtr 625, information of a transmission channel for AUX-CHAIN-IND to follow thereafter, a transmission timing, a type of a transmission PHY, and a precision of an operation clock of the peripheral device are designated. The SyncInfo 626 is not used in the AUX_SCAN_RSP packet. In the TxPower 627, data for representing packet transmission output is designated. Extension data is designated in the ACAD 628.

(Peripheral Device Configuration and System Configuration)

Since the hardware configuration and functional configuration of the communication apparatus 1 in the present embodiment are similar to FIG. 1 and FIG. 2 described in the first embodiment, description thereof is omitted. Also, since the envisioned system configuration is also similar to FIG. 8 described in the first embodiment, description thereof will be omitted here.

(Processing Flow)

Next, with reference to FIG. 17, a flow of processing of the digital camera 810 will be described. FIG. 17 is a flowchart for representing processing by the digital camera 810. The flowchart illustrated in FIG. 17 can be realized by the control unit 105 and the control unit 154 of the digital camera 810 executing control programs that are stored in the ROM 106 and the ROM 152, and executing control of respective hardware as well as computation and processing of information. This processing can be started by a user operating the operation unit 101 of the digital camera 810 to instruct the start of linkage processing. In addition, this processing may be started in a case where device information of a partner device has not been registered (NO in step S701) in step S701 of FIG. 7 described in the first embodiment.

When this processing is started, the BT communication control unit 210 of the digital camera 810 starts (step S1701, step S1702) advertising processing (FIG. 3, FIG. 4) according to BT4 and advertising processing (FIG. 5, FIG. 6) according to BT5. In other words, the BT communication control unit 210 transmits both advertising packets according to BT4 and advertising packets according to BT5. In this processing, the digital camera 810, as a self-identifier, sets a self UUID in the BT4 advertising packets that it then transmits (step S1701). In addition, the digital camera 810 sets a self UUID and self status information in the BT5 advertising packets that it then transmits (step S1702). The self status information is an image capturing setting or an operating mode of the digital camera 810, a value indicating a remaining storage capacity of the storage unit 102, or the like. Note that this status information is assumed to be of a size of 32 bytes or more in this embodiment, and is data of a size that cannot be transmitted in a BT4 advertising packet (ADV_IND packet). The BT communication control unit 210 continues (NO in step S1703) BT4 and BT5 advertising processing until a scan request packet (Scan Request) is received as a scan request signal from the partner device.

When a scan request packet is received (YES in step S1703) from the partner device, the BT communication control unit 210 determines (step S1704) whether the scan request packet corresponds to BT4 advertising or corresponds to BT5 advertising. More specifically, if the received packet is a SCAN_REQ packet, it is determined to be a scan request corresponding to BT4 advertising, and if the received packet is an AUX_SCAN_REQ packet, it is determined to be a scan request corresponding to BT5 advertising.

In a case where the received packet is a SCAN_REQ packet, the partner device information management unit 230 registers (step S1705) in the partner device management table 900 the identification information 920 and the supported BLE version information 930 of the partner device making the supported version of the partner device BT4. Also, the BT communication control unit 210 stops (step S1706) advertising processing according to BT5. Next, the BT communication control unit 210 starts (step S1707) a wait for a connection by a GATT communication from a partner device. In a case where a connection by a GATT communication has been completed (YES in step S1707), the BT communication control unit 210 sets status information of the digital camera 810 in a GATT Notify packet, which it then transmits (step S1708) to the partner device. Status information set here is information similar to the status information designated in the BT5 advertising packet in step S1702. Thereafter, the BT communication control unit 210, so long as GATT communication with the partner device is connected, periodically notifies the status information of the digital camera 810 to the partner device by a GATT Notify packet. Note that this notification may be sent at fixed intervals, and may be sent triggered by the status information of the digital camera 810 being changed. Also, irrespective of whether or not the connection by the GATT communication has completed, the BT communication control unit 210 continues (step S1709) advertising processing according to BT4, and periodically transmits a BT4 advertising packet.

In a case where the received packet is an AUX_SCAN_REQ packet, the partner device information management unit 230 registers (step S1710) in the partner device management table 900 the identification information 920 and the supported BLE version information 930 of the partner device making the supported version of the partner device BT5. Also, the BT communication control unit 210 stops (step S1711) advertising processing according to BT4. Thereafter, the BT communication control unit 210 continues (step S1712) advertising processing according to BT5, and periodically transmits BT5 advertising packets. When status information of the digital camera 810 has changed, the BT communication control unit 210 changes the status information designated in the advertising packet, and continues the BT5 advertising processing.

Figure 18:
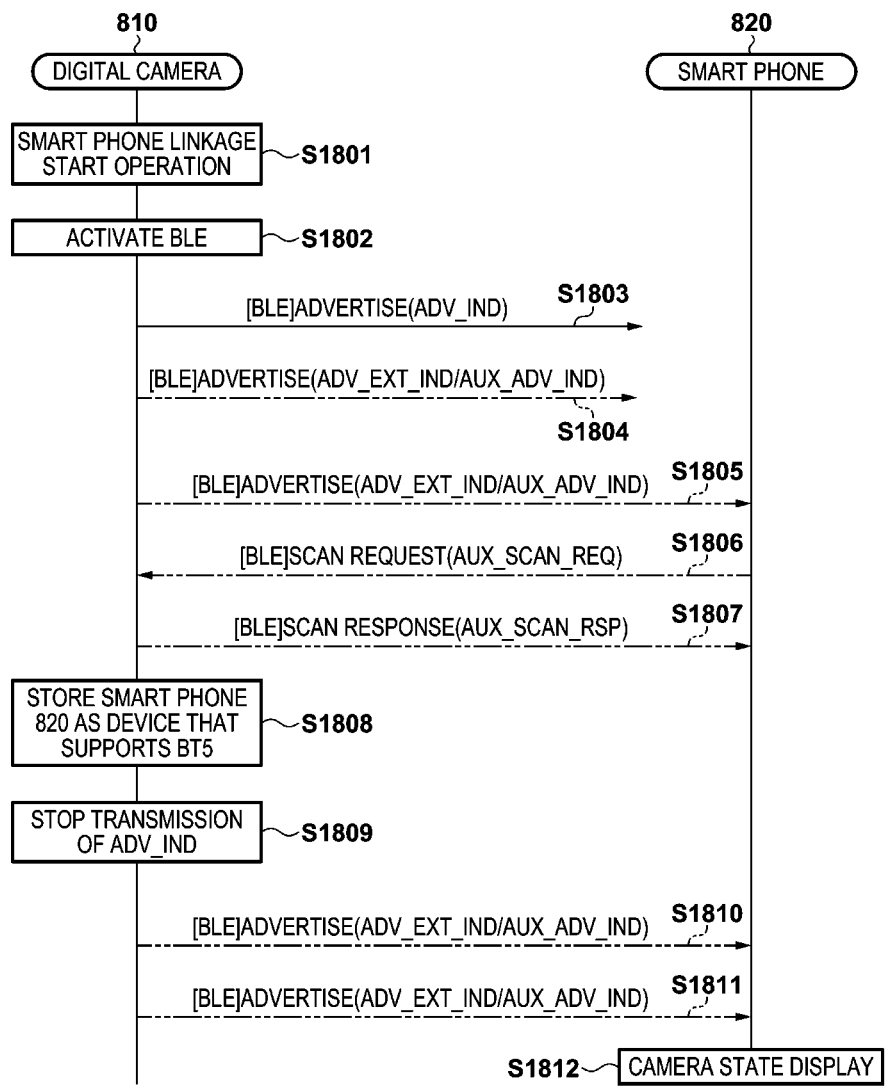
FIG. 18 is an example of a communication sequence between the digital camera 810 and the smart phone 820 in the second embodiment.

Next, using the sequence charts of FIG. 18 to FIG. 19, an example of a communication sequence between the digital camera 810 and the smart phones 820 and 830 in the present embodiment will be described in detail. FIG. 18 is a communication sequence for a case where the digital camera 810 and the smart phone 820 communicate. As previously described, it is assumed that the smart phone 820 supports BT5.

When the user operates the digital camera 810 and instructs (step S1801) the start of linkage processing with the smart phone, the BT communication control unit 210 activates (step S1802) the Bluetooth communication function, and starts advertising processing. The BT communication control unit 210 periodically transmits (step S1803, step S1804) advertising packets (ADV_IND) according to BT4 and advertising packets according to BT5 (ADV_EXT_IND, AUX_ADV_IND). The smart phone 820 which supports BT5 receives (step S1805) an advertising packet according to BT5, and transmits (step S1806) a scan request packet (AUX_SCAN_REQ) in response thereto. The digital camera 810, having received the scan request packet, transmits (step S1807) to the smart phone 820 a scan response packet (AUX_SCAN_RSP). Next, the digital camera 810 stores (step S1808) that the smart phone 820 is a partner device that supports BT5, and stops (step S1809) the periodic transmission of the advertising packet (ADV_IND) according to BT4. Thereafter, the digital camera 810 periodically transmits (step S1810, step S1811) advertising packets (ADV_EXT_IND, AUX_ADV_IND) according to BT5 in which self status information is designated. Also, the smart phone 820 references status information included in the advertising packet, and successively displays (step S1812) on a screen of the smart phone 820 a state of the digital camera 810.

Figure 19:
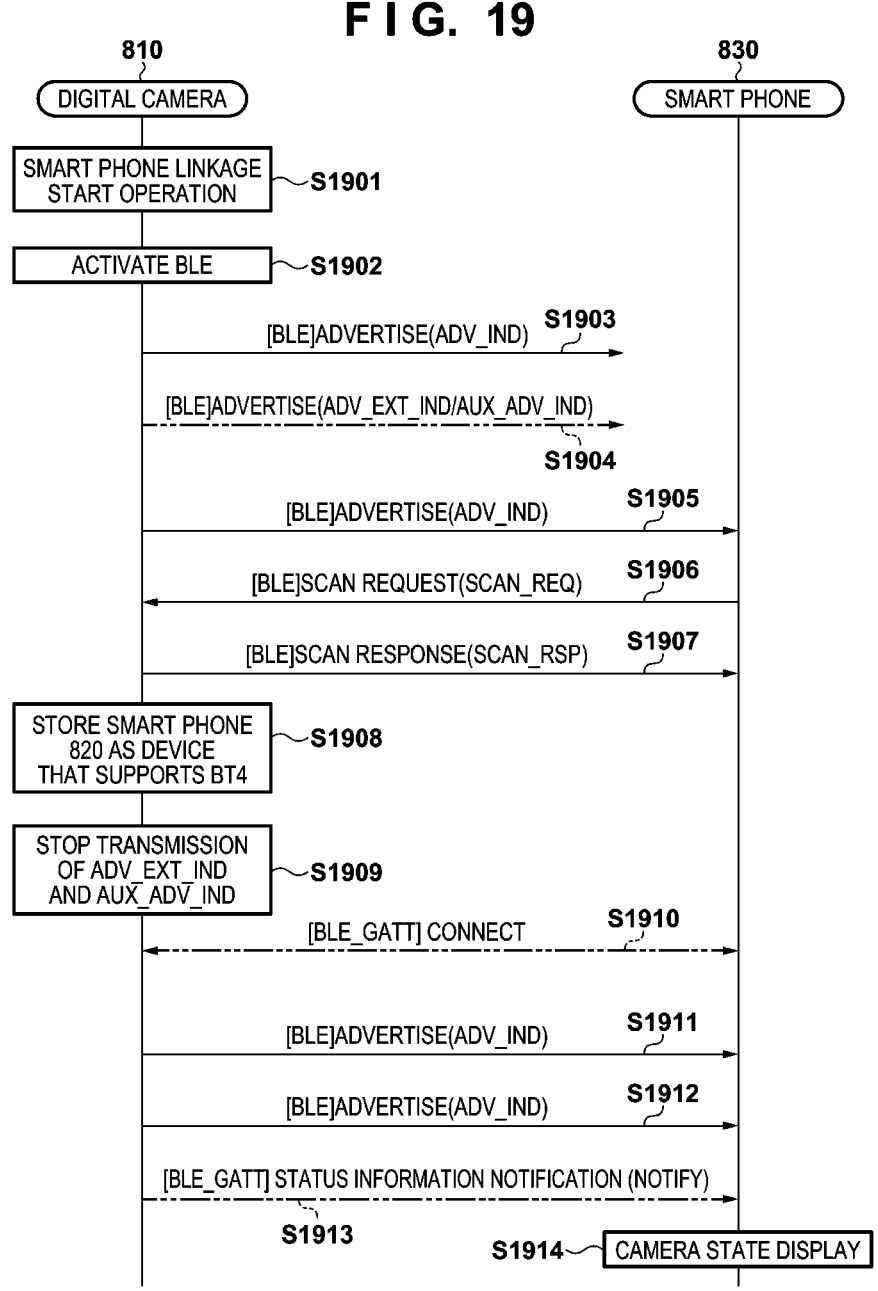
FIG. 19 is an example of a communication sequence between the digital camera 810 and the smart phone 830 in the second embodiment.

FIG. 19 is a communication sequence for a case where the digital camera 810 and the smart phone 830 communicate. As previously described, it is assumed that the smart phone 830 supports BT4 but does not support the BT5.

When the user operates the digital camera 810 and instructs (step S1901) the start of linkage processing with the smart phone, the BT communication control unit 210 activates (step S1902) the Bluetooth communication function, and starts advertising processing. The BT communication control unit 210 periodically transmits (step S1903, step S1904) advertising packets (ADV_IND) according to BT4 and advertising packets according to BT5 (ADV_EXT_IND, AUX_ADV_IND). The smart phone 830 which supports BT4 receives (step S1905) an advertising packet according to BT4, and transmits (step S1906) a scan request packet (SCAN_REQ) in response thereto. The digital camera 810, having received the scan request packet, transmits (step S1907) to the smart phone 830 a scan response packet (SCAN_RSP). Next, the digital camera 810 stores (step S1908) that the smart phone 830 is a partner device that supports BT4, and stops (step S1909) the periodic transmission of the advertising packets (ADV_EXT_IND, AUX_ADV_IND) according to BT5. Next, GATT communication connection processing between the digital camera 810 and the smart phone 830 is performed (step S1910). Thereafter, the digital camera 810 periodically transmits (step S1911, step S1912) advertising packets (ADV_IND) according to BT4. In addition, whenever a self status changes, the digital camera 810 transmits (step S1913) to the smart phone 830 a GATT communication Notify packet in which the self status information is designated. Also, the smart phone 830 references status information included in the Notify packet, and successively displays (step S1914) on a screen of the smart phone 830 a state of the digital camera 810.

As described above, by virtue of the present embodiment, the communication apparatus can transmit an appropriate advertisement packet in accordance with the Bluetooth version that the partner device supports. In addition, it is possible to reduce the power consumption in the communication apparatus by not performing the GATT communication in a case where the partner device supports BT5.

Third Embodiment

In the previously-described embodiment, an embodiment of a single partner device (smart phone) with which the communication apparatus 1 (digital camera 810) simultaneously communicates was described. However, the present invention can be applied to a case where there are a plurality of partner devices. Below, an embodiment of a device configuration in which there are a plurality of partner devices for one communication apparatus will be described.

(Peripheral Device Configuration and System Configuration)

Since the hardware configuration and functional configuration of the communication apparatus 1 in the present embodiment is similar to FIG. 1 and FIG. 2 described in the first embodiment, description thereof is omitted. Also, since the envisioned system configuration is also similar to FIG. 8 described in the first embodiment, description thereof will be omitted here. However, in the present embodiment, the partner device information management unit 230 of the communication apparatus 1 is assumed to be able to manage device information of a plurality of partner devices in the partner device management table 900. In other words, the partner device management table 900 in the present embodiment is a management table that stores multiple records where an identification information 920 and supported BLE version information 930 pair is made to be one record.

(Processing Flow)

Figure 20:
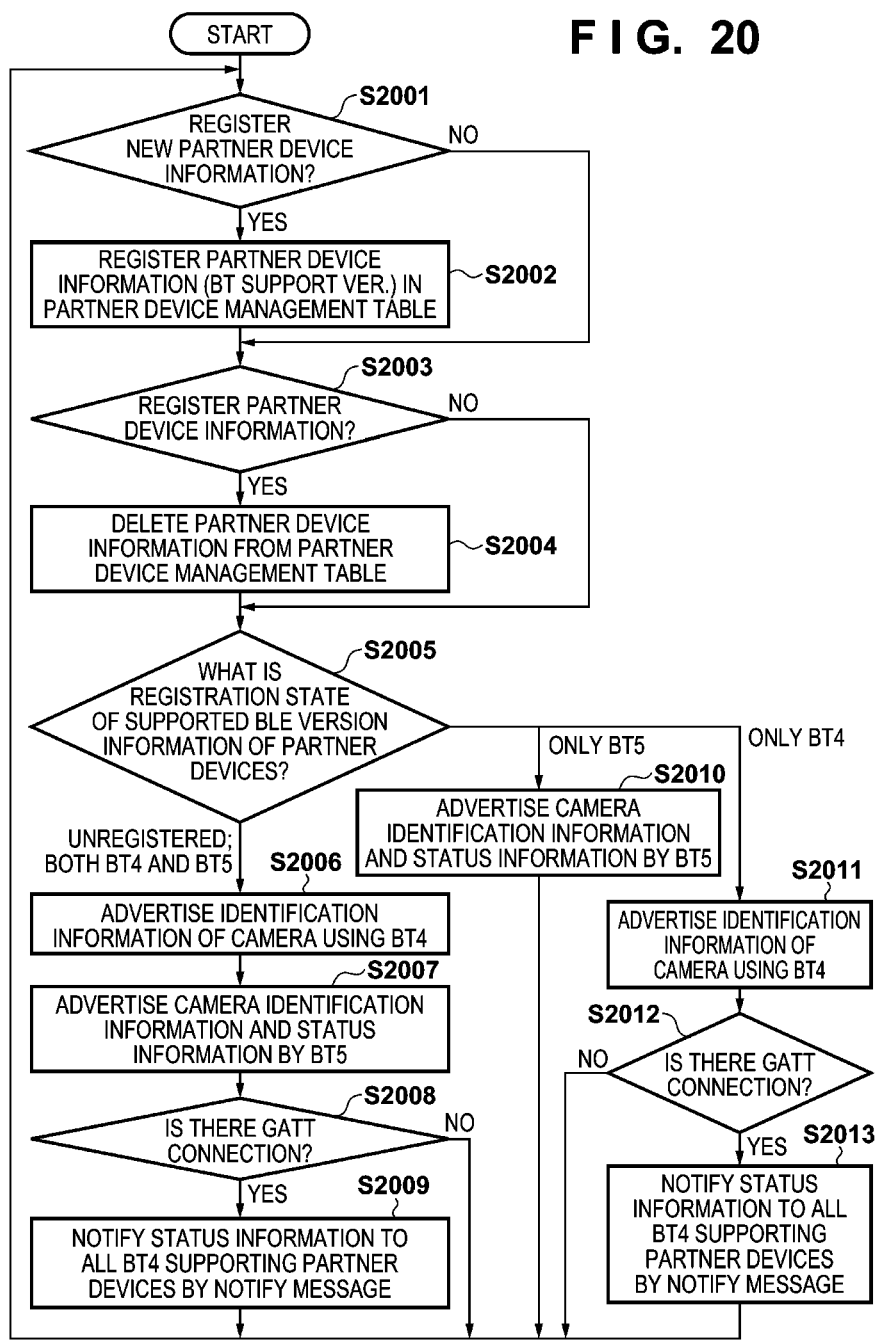
FIG. 20 is a flowchart for representing processing by the digital camera 810 in a third embodiment.

Next, with reference to FIG. 20, a flow of processing of the digital camera 810 will be described. FIG. 20 is a flowchart for representing processing by the digital camera 810. The flowchart illustrated in FIG. 20 can be realized by the control unit 105 and the control unit 154 of the digital camera 810 executing control programs that are stored in the ROM 106 and the ROM 152, and executing control of respective hardware as well as computation and processing of information. This processing can be started by a user operating the operation unit 101 of the digital camera 810 to instruct the start of linkage processing. In addition, this processing can be executed repeatedly by a user operating the operation unit 101 of the digital camera 810 to instruct the end of linkage processing. In addition, this processing may be started in a case where device information of a partner device has not been registered (NO in step S701) in step S701 of FIG. 7 described in the first embodiment.

When this processing is started, the partner device information management unit 230 of the digital camera 810 performs (step S2001) processing for determining whether there is partner device information that should be newly registered in the partner device management table 900. In the present embodiment, registration of partner device information may be performed by a user operating the operation unit 101 of the digital camera 810 to input the identification information and supported BLE version of the partner device. In the case where there is a partner device information that should be newly registered (YES in step S2001), the partner device information management unit 230 registers (step S2002), in the partner device management table 900, the partner device information. Next, the partner device information management unit 230 performs (step S2003) processing for determining whether there is partner device information that should be deleted from the partner device management table 900. In the present embodiment, deletion of partner device information may be performed by a user operating the operation unit 101 of the digital camera 810 to select the identification information the partner device desired to be deleted. In the case where there is partner device information that should be deleted (YES in step S2003), the partner device information management unit 230 deletes (step S2004) from the partner device management table 900 this partner device information.

Next, the partner device information management unit 230 searches for records registered in the partner device management table 900 and collects (step S2005) supported BLE version information for partner devices that are registered. In a case where there is no partner device information registered in the partner device management table 900 or in a case where there is a mix of partner devices that support BT4 and partner devices that support BT5, the BT communication control unit 210 transmits both BT4 and BT5 advertisement packets (step S2006, step S2007). In this processing, the digital camera 810, as a self-identifier, sets its own UUID in the BT4 advertising packets that it then transmits (step S2006). In addition, the digital camera 810 sets a self UUID and self status information in the BT5 advertising packets that it then transmits (step S2007). The self status information is an image capturing setting or an operating mode of the digital camera 810, a value indicating a remaining storage capacity of the storage unit 102, or the like. Note that this status information is assumed to be of a size of 32 bytes or more in this embodiment, and is data of a size that cannot be transmitted in a BT4 advertising packet (ADV_IND packet). Next, the BT communication control unit 210 checks (step S2008) whether or not there is a GATT connection with a partner device that supports BT4. In a case where there is a connection by a GATT communication with a partner device (YES in step S2008), the BT communication control unit 210 transmits (step S2009) a GATT Notify packet in which status information of the digital camera 810 is set to all of the partner devices that support BT4.

In a case where all of the partner devices registered in the partner device management table 900 support BT5, the BT communication control unit 210 transmits (step S2010) a BT5 advertising packet in which the identifier and status information of the digital camera 810 is set. At that time, the BT communication control unit 210 does not transmit a BT4 advertising packet.

In a case where all of the partner devices registered in the partner device management table 900 support BT4, the BT communication control unit 210 transmits (step S2011) a BT4 advertising packet in which the identifier of the digital camera 810 is set. At that time, the BT communication control unit 210 does not transmit a BT5 advertising packet. In addition, the BT communication control unit 210 checks (step S2012) whether or not there is a GATT connection with a partner device that supports BT4. In a case where there is a connection by a GATT communication with a partner device (YES in step S2012), the BT communication control unit 210 transmits (step S2013) a GATT Notify packet in which status information of the digital camera 810 is set to all of the partner devices that support BT4.

Next, using the sequence charts of FIG. 21, an example of a communication sequence between the digital camera 810 and the smart phones 820 and 830 will be described in detail. As previously described, it is assumed that the smart phone 820 supports BT5 and the smart phone 830 supports BT4.

When the user operates the digital camera 810 and instructs (step S2101) the start of linkage processing with the smart phone, the BT communication control unit 210 activates (step S2102) the Bluetooth communication function, and starts advertising processing. The BT communication control unit 210 periodically transmits (step S2103, step S2104) advertising packets (ADV_IND) according to BT4 and advertising packets according to BT5 (ADV_EXT_IND, AUX_ADV_IND). Next, the user operates the digital camera 810 to perform an operation to register the smart phone 820, and registers (step S2105) in the digital camera 810 the identifier information of the smart phone 820 and that it is a partner device that supports BT5. The BT communication control unit 210, having received this, stops (step S2106) transmission of advertising packets (ADV_IND) according to BT4.

Next, when the user operates the smart phone 820 to instruct (step S2107) the start of processing for linkage with the digital camera 810, the smart phone 820 activates (step S2108) the Bluetooth communication function. The smart phone 820 receives (step S2109) advertising packets according to BT5 (ADV_EXT_IND/AUX_ADV_IND) and transmits (step S2110) to the digital camera 810 a scan request packet (AUX_SCAN_REQ) in response thereto. The digital camera 810, having received the scan request packet, transmits (step S2112) to the smart phone 820 a scan response packet (AUX_SCAN_RSP). Thereafter, the smart phone 820 references status information included in the advertising packet, and successively displays (step S2112) on a screen of the smart phone 820 a state of the digital camera 810.

Next, the user operates the digital camera 810 to perform an operation to register the smart phone 830, and registers (step S2113), in the digital camera 810, the identifier information of the smart phone 830 and that it is a partner device that supports BT4. The BT communication control unit 210, having received this, starts (step S2114) transmission of advertising packets (ADV_IND) according to BT4. The BT communication control unit 210 periodically transmits (step S2115, step S2116) advertising packets (ADV_IND) according to BT4 and advertising packets according to BT5 (ADV_EXT_IND, AUX_ADV_IND).

Next, when the user operates the smart phone 830 to instruct (step S2117) the start of processing for linkage with the digital camera 810, the smart phone 830 activates (step S2118) the Bluetooth communication function. The smart phone 830 receives (step S2119) an advertising packet (ADV_IND) according to BT4, and transmits (step S2120) to the digital camera 810 a scan request packet (the SCAN_REQ) in response thereto. The digital camera 810, having received the scan request packet, transmits (step S2121) to the smart phone 830 a scan response packet (SCAN_RSP). Next, GATT communication connection processing between the digital camera 810 and the smart phone 830 is performed (step S2122). Thereafter, whenever a self status changes, the digital camera 810 transmits (step S2123) to the smart phone 830 a GATT communication Notify packet in which the self status information is designated. Also, the smart phone 830 references status information included in the Notify packet, and successively displays (step S2124) on a screen of the smart phone 830 a state of the digital camera 810.

As described above, by virtue of the present embodiment, the communication apparatus can transmit advertisement packets of an appropriate version in a case where there are a plurality of partner devices. In addition, it is possible to reduce the power consumption in the communication apparatus by not performing the GATT communication in a case where the partner device supports BT5. Since a GATT communication packet is transmitted by unicast, a greater power consumption reduction effect can be expected in the case where there are a plurality of partner devices that support BT5 in particular.

Although the above are examples of embodiments representative of the present invention, the present invention is not limited to the embodiments illustrated in the specification and the drawings, and is something that can be implemented modifying within its scope without changing its gist.

For example, in the above-described embodiments, several methods by which the communication apparatus 1 (the digital camera 810) obtains the Bluetooth version that the partner device supports were described, but the present invention is not limited to these. For example, the communication apparatus 1 may determine that a partner device that did not transmit a scan packet in response to an advertising packet according to BT5 for a fixed time period does not support BT5. Also, the communication apparatus 1 may determine that a partner device that requested, by a GATT communication, information that is being transmitted in an advertising packet according to BT5 does not support BT5. In the case of the previously-described first embodiment, in step S702, setting information of the wireless LAN network that the wireless LAN communication control unit 240 generates and the operation state of the digital camera 810 are included in an advertising packet according to BT5 that is transmitted. Thereafter, the communication apparatus 1 registers in the partner device management table 900 a partner device that transmitted a request to obtain this information by a GATT communication as a partner device that does not support BT5. Also, the communication apparatus 1 registers in the partner device management table 900, as a partner device that supports BT5, a partner device that transmitted a wireless LAN start request without transmitting a request to obtain such information in the GATT communication.

Also, in the above-described embodiments, the advertising processing to be performed is decided in accordance with the Bluetooth version that the registered partner device supports, but the advertising processing may be decided using other additional conditions. For example, configuration may be such that the communication apparatus 1 executes the advertising processing according to BT5 only in a case where the size of the data that the digital camera 810 desires to notify to the partner device exceeds the 31 octets that can be transmitted by an ADV_IND packet. Furthermore, in the case where the communication apparatus 1 wishes to notify data whose size is 32 to 62 octets, the communication apparatus 1 may divide up the data and perform the notification in an ADV_IND packet and a SCAN_RESP packet, and execute advertising processing according to BT5 only in the case where the 63 octets are exceeded.

In addition, in the above-described embodiment, Bluetooth is described in the example, but it is possible to apply the foregoing embodiments similarly for other predetermined communication methods as well.

As described above, by virtue of these embodiments, it becomes possible to achieve a reduction in power consumption in the central device as well as the peripheral device and a reduction in network load by switching the advertising method in accordance with the version (standard) that is supported in the central device for Bluetooth.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-044663, filed Mar. 12, 2018, and No. 2018-221678, filed Nov. 27, 2018 which are hereby incorporated by reference herein in their entirety.

What is claimed is:

1. A communication apparatus comprising:
one or more processors; and
one or more memories including instructions that, when executed by the processor(s), cause the apparatus to:
transmit a first signal according to a first version of a predetermined communication method and a second signal according to a second version of the predetermined communication method repeatedly;
obtain information of a version of the predetermined communication method that another communication apparatus supports while transmitting the first signal and the second signal;
register the obtained version of the predetermined communication method that the other communication apparatus supports; and
after registering the obtained version of the predetermined communication method,
stop transmitting the second signal according to the second version while continuing to transmit the first signal in a case where the registered version that the other communication apparatus supports indicates the first version, and
stop transmitting the first signal according to the first version while continuing to transmit the second signal in a case where the registered version that the other communication apparatus supports indicates the second version.

2. The communication apparatus according to claim 1, wherein the communication apparatus obtains the version of the predetermined communication method that the other communication apparatus supports in response to the first signal and/or the second signal.

3. The communication apparatus according to claim 2, wherein the communication apparatus, in a case where a signal received in response to the first signal and/or the second signal is a first request signal corresponding to the first version, obtains the version of the predetermined communication method that the other communication apparatus supports as the first version, and in a case where the received signal is a second request signal corresponding to the second version, obtains the version of the predetermined communication method that the other communication apparatus supports as the second version.

4. The communication apparatus according to claim 2, wherein the communication apparatus, based on the response to the second signal, obtains the version of the predetermined communication method that the other communication apparatus supports.

5. The communication apparatus according to claim 4, wherein in a case where the communication apparatus received the response to the second signal, the communication apparatus obtains the version of the predetermined communication method that the other communication apparatus supports as the second version.

6. The communication apparatus according to claim 1, wherein the communication apparatus obtains the version of the predetermined communication method that the other communication apparatus supports based on a signal received via a connection established in response to the first signal or the second signal.

7. The communication apparatus according to claim 1, wherein the first signal and the second signal indicate a presence of the communication apparatus.

8. The communication apparatus according to claim 1, wherein the predetermined communication method is compliant with the Bluetooth standard.

9. The communication apparatus according to claim 1, wherein the first signal is an advertising packet according to the Bluetooth version 4, and the second signal is an advertising packet according to the Bluetooth version 5.

10. A method of controlling a communication apparatus operable, the method comprising:
transmitting a first signal according to a first version of a predetermined communication method and a second signal according to a second version of the predetermined communication method repeatedly;

obtaining information of a version of the predetermined communication method that another communication apparatus supports while transmitting the first signal and the second signal;

registering the obtained version of the predetermined communication method that the other communication apparatus supports; and after registering the obtained version of the predetermined communication method, stopping transmitting the second signal according to the second version while continuing to transmit the first signal in a case where the registered version that the other communication apparatus supports indicates the first version, and stopping transmitting the first signal according to the first version while continuing to transmit the second signal in a case where the registered version that the other communication apparatus supports indicates the second version.

11. A non-transitory computer-readable storage medium storing a computer program for causing a computer to execute a method of controlling a communication apparatus, the method comprising:

transmitting a first signal according to a first version of a predetermined communication method and a second signal according to a second version of the predetermined communication method repeatedly;

obtaining information of a version of the predetermined communication method that another communication apparatus supports while transmitting the first signal and the second signal;

registering the obtained version of the predetermined communication method that the other communication apparatus supports; and after registering the obtained version of the predetermined communication method, stopping transmitting the second signal according to the second version while continuing to transmit the first signal in a case where the registered version that the other communication apparatus supports indicates the first version, and stopping transmitting the first signal according to the first version while continuing to transmit the second signal in a case where the registered version that the other communication apparatus supports indicates the second version.

* * * * *